United States Patent
Asterjadhi et al.

(10) Patent No.: US 11,844,052 B2
(45) Date of Patent: Dec. 12, 2023

(54) SIGNALING MULTI-BAND OPERATING PARAMETERS IN A WIRELESS LOCAL AREA NETWORK

(71) Applicant: QUALCOMM incorporated, San Diego, CA (US)

(72) Inventors: Alfred Asterjadhi, San Diego, CA (US); George Cherian, San Diego, CA (US); Abhishek Pramod Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 16/440,910

(22) Filed: Jun. 13, 2019

(65) Prior Publication Data

US 2019/0387524 A1 Dec. 19, 2019

Related U.S. Application Data

(60) Provisional application No. 62/695,662, filed on Jul. 9, 2018, provisional application No. 62/684,648, filed on Jun. 13, 2018.

(51) Int. Cl.
*H04W 72/04* (2009.01)
*H04W 72/02* (2009.01)
*H04W 84/12* (2009.01)
*H04W 72/0453* (2023.01)
*H04W 72/20* (2023.01)

(52) U.S. Cl.
CPC ....... *H04W 72/0453* (2013.01); *H04W 72/02* (2013.01); *H04W 72/0406* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2009/0003333 A1* | 1/2009 | Davison | ................. | H04L 41/12 370/389 |
| 2011/0065440 A1* | 3/2011 | Kakani | ................. | H04W 28/18 455/450 |

(Continued)

*Primary Examiner* — Srinivasa R Reddivalam
(74) *Attorney, Agent, or Firm* — Holland & Hart LLP

(57) ABSTRACT

Methods, systems, and devices are described for wireless communications. A wireless device may advertise communication parameters for a particular frequency band over another frequency band. In one example, a wireless device generates multi-band wrapper information element or a neighbor report information element, which may include one or more subelements, each conveying communication information for a particular frequency band. The wireless device may include the multi-band wrapper information element or the neighbor report information element in a management frame and may transmit the management frame over a first frequency band. Another wireless device may receive the management frame over the first frequency band and may obtain the communication information for other frequency bands from the included multi-band wrapper information element. In some cases, a subelement carries communication information that is sufficient for the receiving device to directly associate with the transmitting device over the other frequency bands.

34 Claims, 19 Drawing Sheets

(56) References Cited

U.S. PATENT DOCUMENTS

| | | | |
|---|---|---|---|
| 2012/0155516 A1* | 6/2012 | Kim | H04L 25/0206 |
| | | | 375/219 |
| 2013/0266136 A1* | 10/2013 | Chu | H04W 36/0033 |
| | | | 380/34 |
| 2014/0010186 A1* | 1/2014 | Cordeiro | H04W 36/06 |
| | | | 370/328 |
| 2015/0282032 A1* | 10/2015 | Gupta | H04W 48/14 |
| | | | 370/329 |
| 2016/0205615 A1* | 7/2016 | Seok | H04W 48/16 |
| | | | 370/338 |
| 2018/0054818 A1* | 2/2018 | Kakani | H04W 74/0816 |
| 2019/0222995 A1* | 7/2019 | Abouelseoud | H04W 16/28 |
| 2020/0351783 A1* | 11/2020 | Cariou | H04W 52/16 |

\* cited by examiner

SIGNALING MULTI-BAND OPERATING PARAMETERS IN A WIRELESS LOCAL AREA NETWORK

CROSS REFERENCE

The present Application for Patent claims the benefit of U.S. Provisional Patent Application No. 62/684,648 by ASTERJADHI, et al., entitled "SIGNALING MULTI-BAND OPERATING PARAMETERS IN A WIRELESS LOCAL AREA NETWORK," filed Jun. 13, 2018, and to U.S. Provisional Patent Application No. 62/695,662, by ASTERJADHI, et al., entitled "SIGNALING MULTI-BAND OPERATING PARAMETERS IN A WIRELESS LOCAL AREA NETWORK" filed Jul. 9, 2018, assigned to the assignee hereof, and expressly incorporated herein.

BACKGROUND

The following relates generally to wireless communications, and more specifically to signaling multi-band operating parameters in a wireless local area network (WLAN).

Wireless communications systems are widely deployed to provide various types of communication content such as voice, video, packet data, messaging, broadcast, and so on. These systems are often multiple-access systems capable of supporting communication with multiple users by sharing the available system resources (e.g., time, frequency, and power). WLANs are an example of such systems and are widely deployed and used. Other examples of such multiple-access systems may include code-division multiple access (CDMA) systems, time-division multiple access (TDMA) systems, frequency-division multiple access (FDMA) systems, and orthogonal frequency-division multiple access (OFDMA) systems.

A WLAN, such as a Wi-Fi (IEEE 802.11) network, includes one or more access points (APs). The AP simultaneously supports communications for multiple mobile devices or stations (STAs) over a shared radio frequency spectrum. In certain instances, the WLAN implements contention-based protocols that allow multiple devices (e.g., STAs and APs) to share the same wireless medium (e.g., a channel) without pre-coordination and with minimal interference.

Communications over a WLAN may be performed over one or more frequency bands (e.g., 2.4, 5, 6, or 60 GHz). Existing WLAN protocols do not provide a way to signal operating parameters across all supported frequency bands.

SUMMARY

A wireless device may advertise communication parameters for a particular frequency band over another frequency band. In one example, a wireless device generates a multi-band wrapper information element or a neighbor report information element, which may include one or more sub-elements (or element sets), each conveying communication information for a particular frequency band. The wireless device may include the multi-band wrapper information element or the neighbor report information element in a management frame and may transmit the management frame over a first frequency band. Another wireless device may receive the management frame over the first frequency band and may obtain the communication information for other frequency bands from the included multi-band wrapper information element. In some cases, a subelement carries communication information that is sufficient for the receiving device to directly associate with the transmitting device over the other frequency bands (e.g., without performing a scan or probe operation).

A method of wireless communication is described. The method may include identifying a set of operating parameters for one or more frequency bands supported by a first wireless device, generating multi-band wrapper information element or a neighbor report information element. The multi-band wrapper information element or the neighbor report information element may include one or more sub-elements, each subelement including an indication of a frequency band of the one or more frequency bands and operating parameters associated with the frequency band, generating a management frame including the multi-band wrapper information element or the neighbor report information element, and transmitting the management frame from the first wireless device to a second wireless device.

An apparatus for wireless communication is described. The apparatus may include a first interface, a second interface, and a wireless modem. The wireless modem may be configured to identify a set of operating parameters for one or more frequency bands supported by a first wireless device and generate a multi-band wrapper information element or a neighbor report information element. The multi-band wrapper information element or the neighbor report information element may include one or more subelements, each sub-element including an indication of a frequency band of the one or more frequency bands and operating parameters associated with the frequency band, generate a management frame including the multi-band wrapper information element or the neighbor report information element, and output via the second interface the management frame for transmission from the first wireless device to a second wireless device.

Another apparatus for wireless communication is described. The apparatus may include means for identifying a set of operating parameters for one or more frequency bands supported by a first wireless device, generating multi-band wrapper information element or a neighbor report information element. The multi-band wrapper information element or the neighbor report information element may include one or more subelements, each subelement including an indication of a frequency band of the one or more frequency bands and operating parameters associated with the frequency band, generating a management frame including the multi-band wrapper information element or the neighbor report information element, and transmitting the management frame from the first wireless device to a second wireless device.

A non-transitory computer-readable medium storing code for wireless communication is described. The code may include instructions executable by a processor to identify a set of operating parameters for one or more frequency bands supported by a first wireless device and generate a multi-band wrapper information element or a neighbor report information element. The multi-band wrapper information element or the neighbor report information element may include one or more subelements, each subelement including an indication of a frequency band of the one or more frequency bands and operating parameters associated with the frequency band, generate a management frame including the multi-band wrapper information element or the neighbor report information element, and transmit the management frame from the first wireless device to a second wireless device.

In some examples of the method, apparatuses, and non-transitory computer-readable medium described herein, the neighbor report information element indicates a neighboring basic service set that is implemented by or collocated with the first wireless device.

In some examples of the method, apparatuses, and non-transitory computer-readable medium described herein, a first basic service set is associated with a first frequency band of the one or more frequency bands and a second basic service set is associated with a second frequency band of the one or more frequency bands. Some examples of the method, apparatuses, and non-transitory computer-readable medium described herein may include operations, features, means, or instructions for disabling or restricting enhanced distributed channel access to the second basic service set. In some cases, the disabling or restricting of enhanced distributed channel access to the second basic service set may be based at least in part on a collocation of the first basic service set and the second basic service set. In some cases, disabling or restricting the access to the second BSS may include restricting access to the second BSS to certain time windows.

In some examples of the method, apparatuses, and non-transitory computer-readable medium described herein, generating the multi-band wrapper information element or the neighbor report information element may include operations, features, means, or instructions for generating an information field including the one or more subelements, where the information field includes a variable length.

In some examples of the method, apparatuses, and non-transitory computer-readable medium described herein, generating the multi-band wrapper information element or the neighbor report information element may include operations, features, means, or instructions for generating a length field including an indication of a length of the information field.

In some examples of the method, apparatuses, and non-transitory computer-readable medium described herein, generating the multi-band wrapper information element or the neighbor report information element may include operations, features, means, or instructions for generating a control field within the information field, where the control field indicates the frequency band of a given subelement of the multi-band wrapper information element or neighbor report information element.

In some examples of the method, apparatuses, and non-transitory computer-readable medium described herein, generating the multi-band wrapper information element or neighbor report information element may include operations, features, means, or instructions for generating an indication that the second wireless device can associate with the first wireless device over a frequency band of the one or more frequency bands without performing a scanning or probing operation.

Some examples of the method, apparatuses, and non-transitory computer-readable medium described herein may further include operations, features, means, or instructions for negotiating, over the first frequency band, a security key for communicating with the second wireless device on a different frequency band of the one or more frequency bands.

Some examples of the method, apparatuses, and non-transitory computer-readable medium described herein may further include operations, features, means, or instructions for negotiating, over the first frequency band, an acknowledgement procedure for communications with the second wireless device over on a different frequency band of the one or more frequency bands.

In some examples of the method, apparatuses, and non-transitory computer-readable medium described herein, the one or more subelements include a set of subelements, each subelement being associated with a different frequency band.

In some examples of the method, apparatuses, and non-transitory computer-readable medium described herein, the one or more subelements include a set of subelements, each subelement including a set of information elements associated with the frequency band.

In some examples of the method, apparatuses, and non-transitory computer-readable medium described herein, the indication of the frequency band may include operations, features, means, or instructions for ordering the set of information elements within each subelement so that the information element indicating the frequency band may be located at a beginning of the set of information elements.

Some examples of the method, apparatuses, and non-transitory computer-readable medium described herein may further include operations, features, means, or instructions for ordering the set of information elements within each subelement based on an element identifier value of each information element.

Some examples of the method, apparatuses, and non-transitory computer-readable medium described herein may further include operations, features, means, or instructions for delineating between the one or more subelements of the multi-band wrapper information element or neighbor report information element based on an out-of-order condition between adjacent information elements in the multi-band wrapper information element or neighbor report information element.

In some examples of the method, apparatuses, and non-transitory computer-readable medium described herein, the management frame is transmitted over a first frequency band of the one or more frequency bands. Some examples of the method, apparatuses, and non-transitory computer-readable medium described herein may further include operations, features, means, or instructions for omitting an information element from a subelement of the multi-band wrapper information element or neighbor report information element based on a transmission of the information element for the first frequency band.

Some examples of the method, apparatuses, and non-transitory computer-readable medium described herein may further include operations, features, means, or instructions for identifying a transmission of an information element for the first frequency band and including the information element in a subelement of the multi-band wrapper information element or neighbor report information element based on a content of the information element for the first frequency band being different than a content of the information element for a frequency band for the subelement.

In some examples of the method, apparatuses, and non-transitory computer-readable medium described herein, the management frame is transmitted over a first frequency band of the one or more frequency bands, and the method, apparatuses, and non-transitory computer-readable medium described herein may further include operations, features, means, or instructions for generating an empty information field for a subelement of the multi-band wrapper information element or neighbor report information element based on a transmission of a corresponding information element for the first frequency band.

In some examples of the method, apparatuses, and non-transitory computer-readable medium described herein, a presence of the empty information field indicates that the corresponding information element may be to be inherited by a subelement.

In some examples of the method, apparatuses, and non-transitory computer-readable medium described herein, a presence of the empty information field indicates that the corresponding information element may be to not be inherited by a subelement.

Some examples of the method, apparatuses, and non-transitory computer-readable medium described herein may further include operations, features, means, or instructions for generating a conditional inheritance information element indicating one or more information elements of the first frequency band to not be inherited for communications over the one or more frequency bands and generating an information element for a subelement of the multi-band wrapper information element or neighbor report information element based on the conditional inheritance information element identifying the information element.

Some examples of the method, apparatuses, and non-transitory computer-readable medium described herein may further include operations, features, means, or instructions for generating a conditional inheritance information element indicating one or more information elements of the first frequency band to be inherited for communications over the one or more frequency bands and omitting an information element for a subelement of the multi-band wrapper information element or neighbor report information element based on the conditional inheritance information element identifying the information element.

In some examples of the method, apparatuses, and non-transitory computer-readable medium described herein, the set of operating parameters may include operations, features, means, or instructions for ordering each set of information elements based on an element identifier value of each information element.

In some examples of the method, apparatuses, and non-transitory computer-readable medium described herein, the set of operating parameters may include operations, features, means, or instructions for ordering each set of information elements so that the information element indicating the frequency band may be located at a beginning of the set of information elements.

In some examples of the method, apparatuses, and non-transitory computer-readable medium described herein, the one or more subelements include multi-band information elements, each multi-band information element including an indication of a frequency band of the one or more frequency bands.

In some examples of the method, apparatuses, and non-transitory computer-readable medium described herein, a frequency band of at least one of the one or more subelements of the multi-band wrapper information element or neighbor report information element may be different from a frequency band over which the management frame may be transmitted.

Some examples of the method, apparatuses, and non-transitory computer-readable medium described herein may further include operations, features, means, or instructions for receiving from the second wireless device a second multi-band wrapper information element or neighbor report information element corresponding to a third wireless device.

In some examples of the method, apparatuses, and non-transitory computer-readable medium described herein, the operating parameters associated with the frequency band include access mechanism parameters, timing parameters, or transmission parameters, or any combination thereof.

In some examples of the method, apparatuses, and non-transitory computer-readable medium described herein, the one or more subelements include a single subelement including a set of frequency band indications corresponding to a set of operating parameters associated with a set of frequency bands.

A method of wireless communication is described. The method may include receiving, from a first wireless device, a management frame at a second wireless device, where the management frame includes multi-band wrapper information element or a neighbor report information element. The multi-band wrapper information element or the neighbor report information element may include one or more subelements, each subelement including an indication of a frequency band of one or more frequency bands and operating parameters associated with the frequency band, identifying information for performing communications over one or more indicated frequency bands of the one or more frequency bands based on the multi-band wrapper information element or neighbor report information element, and communicating over the one or more indicated frequency bands based on identifying the information for performing communications.

An apparatus for wireless communication is described. The apparatus may include a first interface, a second interface, and a wireless modem. The wireless modem may be configured to obtain via the first interface, from a first wireless device, a management frame at a second wireless device, where the management frame includes multi-band wrapper information element or a neighbor report information element. The multi-band wrapper information element or the neighbor report information element may include one or more subelements, each subelement including an indication of a frequency band of one or more frequency bands and operating parameters associated with the frequency band, identify information for performing communications over one or more indicated frequency bands of the one or more frequency bands based on the multi-band wrapper information element or neighbor report information element, and communicate over the one or more indicated frequency bands based on identifying the information for performing communications.

Another apparatus for wireless communication is described. The apparatus may include means for receiving, from a first wireless device, a management frame at a second wireless device, where the management frame includes multi-band wrapper information element or a neighbor report information element. The multi-band wrapper information element or the neighbor report information element may include one or more subelements, each subelement including an indication of a frequency band of one or more frequency bands and operating parameters associated with the frequency band, identifying information for performing communications over one or more indicated frequency bands of the one or more frequency bands based on the multi-band wrapper information element or neighbor report information element, and communicating over the one or more indicated frequency bands based on identifying the information for performing communications.

A non-transitory computer-readable medium storing code for wireless communication is described. The code may include instructions executable by a processor to receive, from a first wireless device, a management frame at a second wireless device, where the management frame includes multi-band wrapper information element or a neighbor report information element. The multi-band wrapper information element or the neighbor report information element may include one or more subelements, each subelement including an indication of a frequency band of one or more frequency bands and operating parameters associated with the frequency band, identify information for performing communications over one or more indicated frequency bands of the one or more frequency bands based on the multi-band wrapper information element or neighbor report information element, and communicate over the one or more indicated frequency bands based on identifying the information for performing communications.

In some examples of the method, apparatuses, and non-transitory computer-readable medium described herein, the neighbor report information element indicates a neighboring basic service set that is implemented by or collocated with the first wireless device.

In some examples, the method, apparatuses, or non-transitory computer-readable medium may include operations, features, means, or instructions for decoding the one or more subelements and identifying one or more indicated frequency bands corresponding to the one or more subelements and one or more operating parameters associated with the one or more indicated frequency bands.

Some examples of the method, apparatuses, and non-transitory computer-readable medium described herein may include operations, features, means, or instructions for decoding the length field and determining the length of the information field.

Some examples of the method, apparatuses, and non-transitory computer-readable medium described herein may include operations, features, means, or instructions for communicating over the indicated frequency band based on the operating parameters of the given subelement.

Some examples of the method, apparatuses, and non-transitory computer-readable medium described herein may include operations, features, means, or instructions for associating with the first wireless device without performing a scanning or probing operation.

In some examples of the method, apparatuses, and non-transitory computer-readable medium described herein, the management frame is received over a first frequency band of the one or more frequency bands, and the method, apparatuses, and non-transitory computer-readable medium described herein may further include operations, features, means, or instructions for negotiating, over the first frequency band, a security key for communicating with the second wireless device on a different frequency band of the one or more frequency bands.

In some examples of the method, apparatuses, and non-transitory computer-readable medium described herein, the management frame is received over a first frequency band of the one or more frequency bands, and the method, apparatuses, and non-transitory computer-readable medium described herein may further include operations, features, means, or instructions for negotiating, over the first frequency band, an acknowledgement procedure for communications with the second wireless device over on a different frequency band of the one or more frequency bands.

In some examples of the method, apparatuses, and non-transitory computer-readable medium described herein, the one or more subelements include a set of subelements, each subelement including a set of information elements associated with the frequency band.

Some examples of the method, apparatuses, and non-transitory computer-readable medium may include operations, features, means, or instructions for delineating between the one or more subelements based on identifying consecutive information elements indicating respective frequency bands.

Some examples of the method, apparatuses, and non-transitory computer-readable medium described herein may further include operations, features, means, or instructions for delineating between the one or more subelements of the multi-band wrapper information element or the neighbor report information element based on an out-of-order condition between adjacent information elements in the multi-band wrapper information element or the neighbor report information element.

In some examples of the method, apparatuses, and non-transitory computer-readable medium described herein, the management frame is received over a first frequency band, and the method, apparatuses, and non-transitory computer-readable medium may further include operations, features, means, or instructions for inheriting an information element associated with the first frequency band for transmissions over the one or more frequency bands.

In some examples of the method, apparatuses, and non-transitory computer-readable medium described herein, the management frame may be received over a first frequency band, and where a subelement may include operations, features, means, or instructions for inheriting an information element for the first frequency band corresponding to the empty information field for transmissions over the one or more frequency bands.

In some examples of the method, apparatuses, and non-transitory computer-readable medium described herein, the management frame may be received over a first frequency band, and where the management frame may include operations, features, means, or instructions for identifying the indicated one or more information elements in the one or more subelements.

In some examples of the method, apparatuses, and non-transitory computer-readable medium described herein, the management frame may be received over a first frequency band, and where the management frame may include operations, features, means, or instructions for inheriting the indicated one or more information elements.

DETAILED DESCRIPTION

Figure 1:
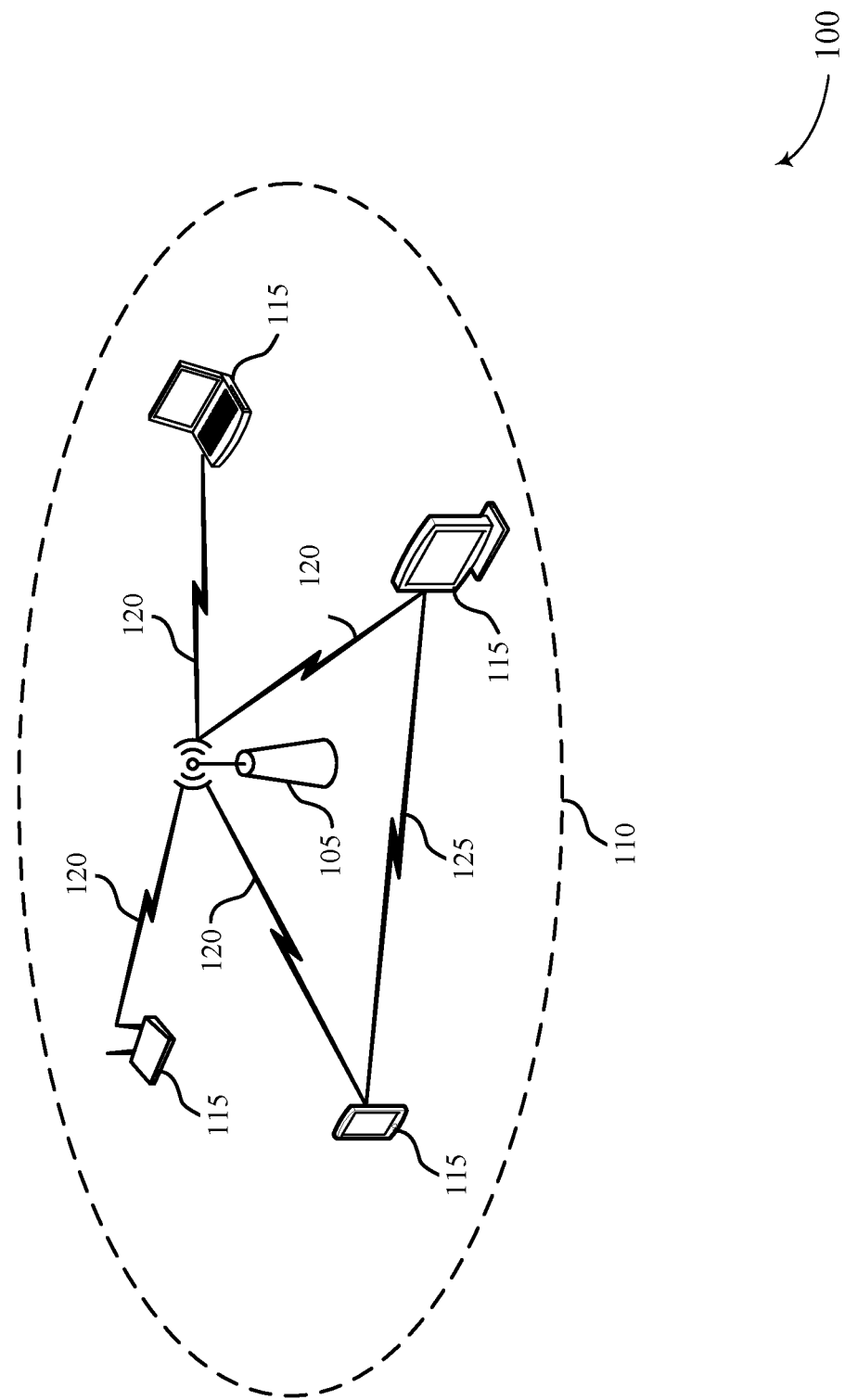
FIG. 1 illustrates an example of a wireless network that supports signaling multi-band operating parameters in accordance with various aspects of the present disclosure.

Communications over a wireless local area network (WLAN) may be performed over one or more frequency bands. To communicate over additional frequency bands, a WLAN may reuse protocols and formats from existing frequency bands. Existing WLAN protocols do not provide a way to signal operating parameters across all supported frequency bands. Moreover, the reuse of existing protocols and formats to communicate over new frequency bands (e.g., the 6 GHz band) may detrimentally affect legacy devices that are not configured to use the new frequency bands.

In some cases, procedures for accessing wireless spectrum may be different for different frequency bands. For example, for a first type of frequency band (e.g., 2.4, 5, or 60 GHz), a wireless station (STA) may gain access to shared spectrum (e.g., unlicensed spectrum) by associating with an access point (AP) over a frequency band using access protocols or parameters that are particular to the frequency band. While for a second type of frequency band (e.g., 6 GHz), a STA may gain access to shared spectrum by associating with an AP over a frequency band using access protocols or parameters that are dynamically set by the AP. That is, for the first type of frequency band, a STA may begin the association process with an AP by first sending a probe request according to a predetermined protocol and using predetermined transmission parameters (e.g., according to a predetermined timing, access, modulation and coding scheme (MCS), or number of spatial streams (NSS)) associated with the frequency band. While for the second type of frequency band, a STA may begin the association process with an AP by listening for a management frame over a frequency band of the second type of frequency band. Only after receiving the management frame, the STA may then use protocols and transmission parameters advertised by the AP in the management frame to associate with the AP over the second frequency band. Thus, in some cases, a STA using the second type of frequency band may begin the association process with an AP over a frequency band only after acquiring certain communication information that is unique to the AP. In some cases, an AP advertises its communication information over only the frequency band itself.

To reduce latency associated with association, a wireless device may advertise, over a first frequency band (e.g., the 2.4 or 5 GHz band), communication parameters for associating with an AP over the second type of frequency band. In this way, a wireless device that receives the advertised communication parameters over the first frequency band may directly associate with the transmitting device over a frequency band (e.g., 6 GHz) of the second type of frequency band without performing discovery operations, such as scanning or sending a probe request, or obtaining other information, such as a security key or acknowledgement scheme.

In one example, a multi-band (MB) Wrapper information element (IE) format may be used to convey operating information for associating and communicating with a wireless device over a particular frequency band. The MB Wrapper IE format may include an element ID field, a length field, an element ID extension field, and an information field including one or more subelements. Each subelement may be associated with a frequency band and may carry operating parameters for communicating over the frequency band along with an indication of the frequency band. Additionally, or alternatively, the subelements may be included in an information field of a Neighbor Report IE specifying a neighbor AP that is collocated with the AP sending the Neighbor Report IE. In some examples, the neighbor report IE may be a reduced neighbor report IE. A reduced neighbor report IE may contain fewer fields than a neighbor report IE, and may include a collocated AP field.

A wireless device may generate an MB Wrapper IE or Neighbor Report IE including one or more subelements. Each subelement may include operating parameters for communicating with the wireless device over a particular frequency band along with an indication of the particular frequency band. As used herein, the term subelement may refer to a field within an element that carries another element, or it may refer to a field. The indication of the particular frequency band may be conveyed using either one or more control fields within the information field or an information element that includes a field for indicating frequency band and/or channel information. When generating an MB Wrapper IE or Neighbor Report IE containing multiple subelements, the wireless device may differentiate subelements by including the frequency band indication at the beginning of each subelement. Or in some cases, the subelements may be differentiated based on a violation of an increasing order rule. That is, information elements, including an information element including the frequency band indicator, within each subelement may be ordered from the information element with the lowest element ID to the information element with the highest element ID. The subelements may be identified by identifying an information element having an element ID that is lower than an element ID of a previous information element.

The wireless device may generate a management frame. The management frame may include operating parameters for the first frequency band over which the management frame is to be transmitted—which may be referred to as the operating band. The management frame may also include the MB Wrapper IE or Neighbor Report IE, which may include operating parameters for one or more particular frequency bands. In some cases, the wireless device generates the MB Wrapper IE or Neighbor Report IE based on the operating parameters generated for the first frequency band. For example, the wireless device may exclude or abbreviate certain operating parameters from a particular subelement associated with a particular frequency band based on determining that the same operating parameters are included in the operating parameters for the first frequency band—e.g., based on identifying that communications over the first frequency band and the particular frequency band use a common information element carrying the same or similar content. A device that receives the management frame may inherit the common operating parameters from the first frequency band for communications over the particular frequency band associated with the particular subelement.

In other cases, the wireless device generates a Conditional Inheritance IE that lists exactly which information elements should be inherited from the operating band. Alternatively, the wireless device generates a Conditional Inheritance IE that lists exactly which information elements should not be inherited from the operating band. By inheriting information elements from the operating band, a size of the management frame may be decreased. The management frame or the MB Wrapper IE or Neighbor Report IE may include one or more Conditional Inheritance IEs.

In some examples, the operating parameters for a particular frequency band included in the MB Wrapper IE or Neighbor Report IE and/or the operating parameters inherited from the operating band provide sufficient information so that a receiving device may associate with the wireless device in the particular frequency band without performing a scan or probe operation and without obtaining additional information about the basic service set (BSS) of the AP. The wireless device may include an indication (e.g., a bit or field) in the management frame, MB Wrapper IE, or Neighbor Report IE indicating that the information for a particular frequency band is complete.

The wireless device may transmit the management frame to a UE over a first frequency band. Or the wireless device may broadcast the management frame over the first frequency band.

Another wireless device may receive the management frame over the first frequency band and may obtain information for communicating with the transmitting device over one or more different frequency bands. In some cases, the receiving device may inherit operating parameters from the first frequency band for communications over the one or more frequency bands indicated by the subelements. In some examples, the receiving device determines which operating parameters to inherit based on a Conditional Inheritance IE.

In some cases, the receiving device may use the determined and inherited operating parameters to associate with the transmitting device over a particular frequency band without performing additional discovery procedures based on determining that the information for the particular frequency band is complete. In some examples, the receiving device may determine that the information for the particular band is complete based on receiving the indication discussed above. After decoding the MB Wrapper IE or Neighbor Report IE, the receiving device may broadcast the MB Wrapper IE or Neighbor Report IE on behalf of the transmitting device.

Features of the disclosure introduced above are further described below in the context of a wireless communication system. Specific examples are then described of information element formats that support signaling communication information for external frequency bands, along with an example process flow for signaling communication information for external frequency bands. These and other features of the disclosure are further illustrated by and described with reference to apparatus diagrams, system diagrams, and flowcharts that relate to signaling communication information for external frequency bands.

FIG. 1 illustrates an example of a network, such as a WLAN 100, that supports signaling multi-band operating parameters in accordance with various aspects of the present disclosure. The WLAN 100 includes an AP 105 and STAs 115. STAs 115, can also be referred to as a mobile stations (MS), mobile devices, access terminals (ATs), user equipment (UEs), subscriber stations (SSs), or subscriber units. Each STA 115 may be stationary or mobile. The STAs 115 and APs 105 can be mobile handsets, tablet computers, personal digital assistants (PDAs), other handheld devices, netbooks, notebook computers, tablet computers, laptops, desktop computers, display devices (e.g., TVs, computer monitors, etc.), printers, etc.

Each AP 105 has a coverage area 110, and the STAs 115 are dispersed throughout the coverage area 110. The WLAN 100 includes APs 105 of different types (e.g., metropolitan area, home network, etc.), with varying sizes of coverage areas and overlapping coverage areas for different technologies. A coverage area 110 for an AP 105 can be divided into sectors making up only a portion of the coverage area. The STAs 115 within the coverage area 110 are within range of the AP 105—i.e., the STAs 115 may associate and communicate with the AP 105 via a communication link 120. While only one AP 105 is illustrated, the WLAN 100 may have multiple APs 105, and a STA 115 can be covered by more than one AP 105. Thus, a STA 115 can associate with multiple APs 105 at different times. A single AP 105 and an associated set of STAs is referred to as a BSS. An extended service set (ESS) is a set of connected BSSs. A distribution system (DS) is used to connect APs 105 in an extended service set.

The STAs 115 and AP 105 shown in FIG. 1 may communicate according to the WLAN radio and baseband protocol including physical (PHY) and medium access control (MAC) layers from IEEE 802.11, and its various versions including, but not limited to, 802.11b, 802.11g, 802.11a, 802.11n, 802.11ac, 802.11ad, 802.11ah, 802.11ax, 802.11z, etc. While the STAs 115 are capable of communicating with each other through the AP 105 using communication links 120, STAs 115 can also communicate directly with each other via direct wireless communication links 125. Direct wireless communication links 125 can occur between STAs 115 regardless of whether any of the STAs is connected to an AP 105. Examples of direct wireless communication links 125 include Wi-Fi Direct connections, connections established by using a Wi-Fi Tunneled Direct Link Setup (TDLS) link, and other peer-to-peer (P2P) group connections. Other devices can also communicate with the AP 105.

The STAs 115 and AP 105 may communicate with one another over multiple frequency bands including the 2.4, 3, 5, 6, and 60 GHz bands. In some cases, the AP 105 may communicate with one subset of the STAs 115 over a first frequency band and with another subset of the STAs 115 over another frequency band. The STAs 115 may use different access protocols and communication parameters to associate with (or connect to) and communicate with the AP 105 over different frequency bands. In some cases, a STA 115 may use a predetermined set of access protocols and communication parameters to associate with AP 105 over one frequency band (e.g., 2.4, 5, or 60 GHz bands) while using a set of access protocols and communication parameters particular to AP 105 to associate with AP 105 over another frequency band (e.g., the 6 GHz band).

In some examples, a STA 115 may not access an AP 105 over a particular frequency band (e.g., the 6 GHz band) without first learning the access and communication parameters set by the AP 105 for communications over the particular frequency band. Thus, before associating with the AP 105, the STA 115 may first obtain the AP-specific parameters, which the AP 105 may advertise over only the particular frequency band. At the same time, the STA 115 may be communicating with the AP 105 or a different AP 105 over another frequency band (e.g., the 2.4 GHz band), which may be referred to as the operating band. To reduce latency for associating with the AP 105 over the particular frequency band, a wireless device (e.g., an AP 105 or STA 115) may advertise, over the operating band of the STA 115, communication parameters for associating with the AP 105 on the particular frequency band.

In some cases, a STA 115 may be associated with an AP 105 over an operating band, and may temporarily use another frequency band to exchange frames with the AP 105. Such a temporary session may be referred to as a fast session transfer (FST). During an FST, a STA 115 may be provided with limited information and may not be required to associate with the AP 105 on the other frequency band (e.g., the 60 GHz band), and the AP 105 may not assign an association ID (AID) to the STA 115 for the other frequency band. That is, the FST link between the STA 115 and AP 105 may operate as an auxiliary link. In some cases, the FST link may be a short-term communication link with the AP 105 over another frequency band. For instance, the existence of the FST link may be dependent on desired channel conditions, and the FST link may be lost if certain conditions, such as antenna direction and distance between the STA 115 and AP 105, change. In some cases, to maintain the FST link, an AP 105 and/or STA 115 may transmit periodic ping or hello messages to keep the FST link alive or to indicate that the STA 115 is reachable. Due to the instability of the FST link, a STA 115 may maintain a communication link and association with the AP 105 over an "anchor" channel (e.g., on the 2.4 or 5 GHz band) along with the FST link.

By contrast, an AP 105 may use an MB Wrapper IE or Neighbor Report IE format to convey association and communication information for itself or a collocated AP 105 over one or more alternate bands (e.g., the 6 GHz band), and a STA 115 may fully associate with the AP 105. The MB Wrapper IE or Neighbor Report IE format may include one or more subelements, each including an indication of a particular frequency band along with operating parameters for associating and communicating with a particular AP 105 over the particular frequency band. The communication link established between the AP 105 and STA 115 over an alternate band (e.g., the 6 GHz band) may be more stable than an FST link due to the completeness of the information conveyed in the operating parameters. In some cases, the STA 115 may associate with the AP 105 over an alternate band using the information conveyed in the operating parameters and may disassociate with the AP 105 on the operating band after associating with the AP 105 over the alternate band. After such association, the other band may be considered as the primary operating band. In some cases, a STA 115 may receive an MB Wrapper IE or Neighbor Report IE for an AP 105 without being associated with the AP 105 over an operating band (e.g., in a broadcast message from the AP 105 or a neighboring device). The STA 115 may associate with the AP 105 over the alternate band using the operating parameter conveyed by the MB Wrapper IE or Neighbor Report IE. In this way, a STA 115 may use the MB Wrapper IE or Neighbor Report IE for discovery of frequency bands that are available for communication with an AP 105.

In some examples, the wireless device may transmit an MB Wrapper IE or Neighbor Report IE within a management frame over a frequency band (e.g. in which a STA 115 is currently operating in). The STA 115 may receive the management frame and identify the operating parameters for communicating with the AP 105 over the particular frequency band. The STA 115 may then associate with the AP 105 over the particular frequency band without performing a scan or probe operation (e.g., if the operating parameters are complete for the particular frequency band). In this way, a STA 115 may receive, over an operating band, AP-specific information for communicating with an AP 105 over a particular frequency band and may reduce latency for associating with the AP 105 over the particular frequency band.

Figure 2:
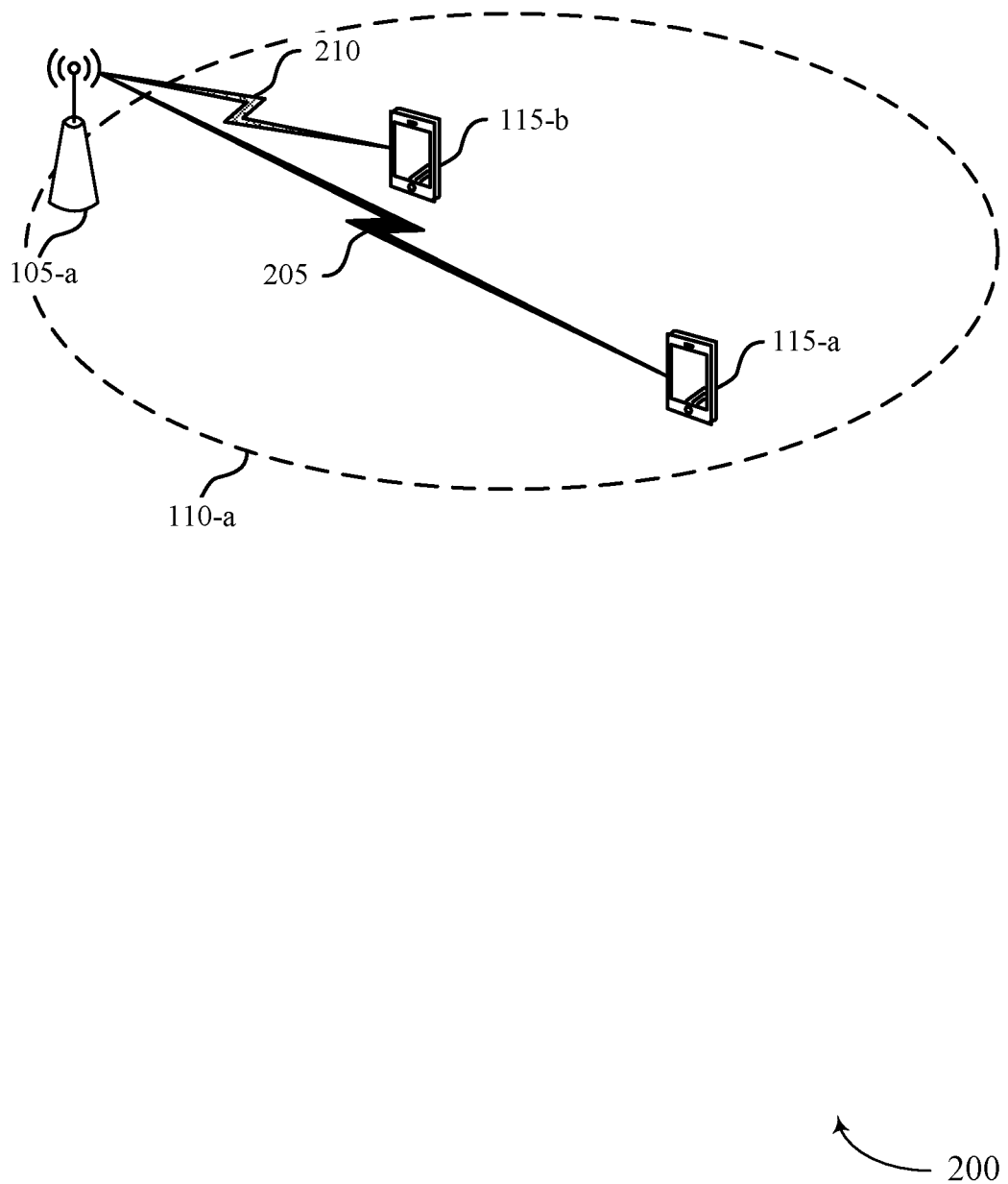
FIG. 2 illustrates an example wireless communications subsystem that supports signaling multi-band operating parameters in accordance with various aspects of the present disclosure.

FIG. 2 illustrates an example wireless communications subsystem 200 that supports signaling multi-band operating parameters in accordance with various aspects of the present disclosure. Wireless communications subsystem 200 includes STAs 115-a, STA 115-b, AP 105-a, and coverage area 110-a, which may be respective examples of the STAs 115, AP 105, and coverage area 110 of FIG. 1. STA 115-a, STA 115-b, and AP 105-a may communicate with one another via first communication link 205 and second communication link 210.

First communication link 205 may be used to exchange information between a STA and AP over a first frequency band (e.g., a 2.4, 5, or 60 GHz band). Second communication link 210 may be used to exchange information between a STA and AP over a second frequency band (e.g., a 6 GHz band).

In some examples, STA 115-a may associate with and establish first communication link 205 with AP 105-a over a first frequency band (e.g., the 2.4 GHz band) according to a first set of operating parameters. Similarly, STA 115-b may associate with and establish second communication link 210 with AP 105-a over a second frequency band (e.g., 6 GHz band) according to a second set of operating parameters. Operating parameters may include timing information (e.g., Target Wake Time (TWT) information), access protocol information (e.g., triggered or enhanced distributed channel access (EDCA) information), and/or transmission parameters (e.g., MCS, transmit power, etc.). For example, a management frame may include at least one operating parameter that indicates a transmit power for one or more frequency bands. In another example, a management frame may include at least one operating parameter that indicates channel access information, which may include trigger based access information or EDCA information. In some cases, the operating parameters may include one or more information elements (e.g., HE Capabilities IE, HE Operation IE, UORA Parameter Set IE, MU EDCA IE, Spatial Reuse Parameter Set IE, NDP Feedback Report Parameter Set IE, BSS Color Change Announcement IE, Quick Time Period Setup IE, ESS Report IE, OPS IE, and HE BSS Load IE, etc.). The second set of operating parameters for associating and/or connecting with AP 105-a may be unique to AP 105-a.

In some cases, if AP 105-a or set of collocated APs supports multiple BSSs over different frequency bands, EDCA access by STA 115-b may be disabled or restricted for one of the frequency bands. For example, if an AP 105-a or set of collocated APs supports a first BSS over a 2.4 GHz band or a 5 GHz band in parallel with a second BSS over a 6 GHz band, the AP 105-a or set of collocated APs may disable or restrict EDCA communications to the second BSS over the 6 GHz band based on the collocation. When EDCA communications are disabled or restricted over the 6 GHz band, STA 115-b may transmit to the AP 105-a over the 6 GHz band or attempt to access the 6 GHz band when triggered by AP 105-a or during certain time windows specified by AP 105-a, but STA 115-b may not transmit to the AP 105-*a* spontaneously based on EDCA access to the channel outside of the specified time windows or without a trigger.

In some cases, AP 105-*a* may generate an MB Wrapper IE or Neighbor Report IE. The MB Wrapper IE format may include an element ID field, a length field, an element ID extension field, and an information field including one or more subelements containing management information for different frequency bands. The Neighbor Report IE format may include an element ID field, a length field, a BSS identifier (BSSID) field, a BSSID information field, an operating class field, a channel number field, a PHY type field, and an information field including one or more subelements containing management information for different frequency bands. The BSSID field and BSSID information field may specify a BSSID of a BSS that is collocated with or managed by AP 105-*a*.

The one or more subelements generated by AP 105-*a* for the MB Wrapper IE or Neighbor Report IE may include operating parameters for communicating with AP 105-*a* over the second frequency band along with an indication identifying the second frequency band as being associated with the signaled operating parameters. The indication identifying the second frequency band may be located at a beginning of the subelement or may be located according to an element ID of the indication (e.g., in an increasing element ID order). In some cases, the indication identifying the second frequency band is a control field within the information field. In other cases, the indication identifying the second frequency band is an information element that includes a field for indicating frequency band and/or channel information, such as an MB Wrapper IE or a Neighbor Report IE. The operating parameters may include operating information, such as timing, access protocols, and transmission information (e.g., MCS, NSS, and transmit power). Additional details of the MB Wrapper IE format are discussed at least in FIGS. 3A and 3B below.

AP 105-*a* may transmit a management frame including the generated MB Wrapper IE or Neighbor Report IE over the first frequency band. The management frame may also include parameters for operating in the first frequency band. In some examples, AP 105-*a* uses operating parameters in the second frequency band that are the same as the operating parameters used in the first frequency band. To decrease overhead, AP 105-*a* may identify the common operating parameters and generate the MB Wrapper IE or Neighbor Report IE based on the identified common operating parameters. For example, AP 105-*a* may remove or abbreviate common operating parameters from the MB Wrapper IE or Neighbor Report IE. A wireless device that receives the MB Wrapper IE or Neighbor Report IE may assume that the content of common operating parameters for the first frequency band also applies to communications over the second frequency bands. In other words, the receiving device may "inherit" the operating parameters of the first frequency band for communications over the second frequency band.

In some cases, AP 105-*a* removes or abbreviates common operating parameters according to a set of inheritance rules. For example, AP 105-*a* may include common operating parameters in a generated MB Wrapper IE or Neighbor Report IE when the contents of the common operating parameters are different. Otherwise, if the contents are the same, AP 105-*a* may refrain from including the common operating parameters in the MB Wrapper IE or Neighbor Report IE. A wireless device that receives the MB Wrapper IE or Neighbor Report IE without an operating parameter that is included in a management frame over a first frequency band may inherit the operating parameter from the first frequency band. In another example, for common operating parameters sharing the same contents, AP 105-*a* may include the operating parameters in the MB Wrapper IE or Neighbor Report IE, but a length of the operating parameters may be abbreviated. For example, the operating parameters may include a header identifying the operating parameter but may not convey the associated information—e.g., a common information element may be included in the MB Wrapper IE or Neighbor Report IE with a length field indicating that no information is carried in the information element. In another example, if an operating parameter for the first frequency band does not apply to the second frequency band, AP 105-*a* may include the operating parameter in a subelement without an information field. A wireless device that receives the MB Wrapper IE or Neighbor Report IE may identify the operating parameter as being present.

In another example, AP 105-*a* may generate a Conditional Inheritance IE that identifies operating parameters that are not to be inherited by the second frequency band—e.g., by listing the Element IDs of information elements that are not applicable to the second frequency band. Similarly, in another example, AP 105-*a* may generate a Conditional Inheritance IE that identifies operating parameters that are not to be inherited by the second frequency band—e.g., by listing the Element IDs of information elements that are to be inherited by the second frequency band. Additional details of the Conditional Inheritance IE format are discussed at least in FIG. 4 below.

In some cases, AP 105-*a* may include an indication in the management frame that the information carried in MB Wrapper IE or Neighbor Report IE for the second frequency band is complete and that STA 115-*a* may begin associating with AP 105-*a* over the second frequency band without performing additional scanning or probing on the second frequency band for discovery and without gathering additional information about the BSS. The indication may be included in the management frame or as a field in the MB Wrapper IE or Neighbor Report IE.

STA 115-*a* may receive the management frame via first communication link 205 and may identify the subelement in the MB Wrapper IE or Neighbor Report IE. STA 115-*a* may then identify the operating parameters for associating and communicating with AP 105-*a* over the second frequency band based on the operating parameters and frequency band indication included in the MB Wrapper IE or Neighbor Report IE and based on any inherited operating parameters. In some cases, the management frame may also include operating parameters for communicating over the first frequency band.

In some examples, STA 115-*a* may inherit at least a portion of the operating parameters from the first frequency band for communications over the second frequency band. For example, STA 115-*a* may assume that an operating parameter for the first frequency band that is not included in the MB Wrapper IE or Neighbor Report IE applies to communications over the second frequency band. In another example, STA 115-*a* may determine that an operating parameter for the first frequency band is to be inherited based on identifying that a length field of a corresponding information element is indicating that no information is carried by the information element. In another example, STA 115-*a* may determine that an operating parameter is to be inherited based on receiving a Conditional Inheritance IE that includes the operating parameter in a list of operating parameters that are to be inherited.

In another example, STA 115-a may determine that an operating parameter for the first frequency band is not to be inherited based on an information element corresponding to the operating parameter being included in the MB Wrapper IE or Neighbor Report IE without an information field. In another example, STA 115-a may determine that an operating parameter for the first frequency band is not to be inherited based on receiving a Conditional Inheritance IE that includes the operating parameter in a list of operating parameters that are not to be inherited.

In some cases, STA 115-a may negotiate, over the first frequency band, a security key for communicating with AP 105-a over the second frequency band before associating with AP 105-a over the second frequency band. In some cases, STA 115-a may inherit the security key derived for the first frequency band. STA 115-a may also setup, over the first frequency band, an acknowledgement procedure, such as a block acknowledgement (BA) session, for the second frequency band. The acknowledgement procedure may include an Add BlockACK (ADDBA) frame exchange. STA 115-a and AP 105-a may similarly setup, over the first frequency band, additional features for use over the second frequency band.

STA 115-a may then associate with and begin communicating with AP 105-a over the second frequency band. In some cases, STA 115-a may associate with AP 105-a over the second frequency band without performing a scanning or probing operation—e.g., based on receiving an indication that the information carried in the MB Wrapper IE or Neighbor Report IE is complete).

In some examples, AP 105-a may generate an MB Wrapper IE or Neighbor Report IE including multiple subelements containing management information for multiple frequency band. A first subelement may include operating parameters for communicating with AP 105-a over the second frequency band along with an indication of the second frequency band; a second subelement may include operating parameters for communicating with AP 105-a over a third frequency band along with an indication of the third frequency band, and so on.

To differentiate one subelement from another subelement, AP 105-a may generate the MB Wrapper IE or Neighbor Report IE so that each subelement begins with its corresponding frequency band indication. In this way, a receiving device may identify a subelement as being composed of a first frequency indication and all of the operating parameters up until the beginning of a next frequency indication. In another example to differentiate one subelement from another subelement, AP 105-a may generate each subelement according to an increasing or decreasing order rule. In this way, a receiving device may determine the boundaries of a subelement based on identifying an information element having a lower, or the same, Element ID value than a previous information element. Moreover, the frequency band indication will be included within each subelement. Additional details of the MB Wrapper IE format are discussed at least in FIGS. 3A and 3B below.

AP 105-a may transmit a management frame including the MB Wrapper IE or Neighbor Report IE over the first frequency band. The management frame may also include parameters for operating in the first frequency band. As above, the subelements for other frequency bands may inherit operating parameters from the first frequency band, either implicitly—e.g., by not including the operating parameters in a subelement—or explicitly—e.g., by including a header of a corresponding information element in a subelement or including the subelement in a Conditional Inheritance IE that indicates which operating parameters to inherit. Or the subelements for other frequency bands may not inherit operating parameters from the first frequency band that are not applicable to the other frequency bands by including a corresponding information element in a subelement without an information field or by including the subelement in a Conditional Inheritance IE that indicates which operating parameters are not to be inherited.

AP 105-a may also transmit an indication that the information carried in the wrapper for one or more particular frequency bands is complete, and the STA 115-a may associate with the AP over the indicated frequency bands without performing additional scanning, probing, or discovery.

STA 115-a may receive the management frame via first communication link 205 and may identify the subelements in the MB Wrapper IE or Neighbor Report IE. STA 115-a may determine operating parameters for each of the frequency bands corresponding to each of the subelements. In some cases, multiple subelements may signal operating information for a single frequency band. As discussed above, STA 115-a may inherit operating parameters of the first frequency band for communications over one or more of the other frequency bands. In some cases, STA 115-a may inherit a security key from the first frequency band for communications over the other frequency bands indicated by the subelements. STA 115-a may also establish, over the first frequency band, an acknowledgement procedure for communications in another frequency band. STA 115-a may then associate with and begin communicating with AP 105-a over the different frequency bands without performing a scanning or probing operation.

In alternative examples, AP 105-a may generate an MB Wrapper IE or Neighbor Report IE including one subelement containing management information for multiple frequency bands. For example, the subelement may include multiple information elements where different subsets of the multiple information elements may be associated with particular frequency bands. The different subsets may be delineated based on the occurrence of a particular information element. For instance, each subset may begin with an MB IE that indicates the beginning of a new subelement for a particular frequency band. In another instance, the different subsets may be delineated based on identifying an out-of-order scenario (e.g., a violation of a decreasing or increasing order rule).

In some cases, a STA that is associated with AP 105-a, such as STA 115-a or STA 115-b, transmits an MB Wrapper IE or Neighbor Report IE for AP 105-a. For example, STA 115-a or STA 115-b may include the MB Wrapper IE or Neighbor Report IE in a (Reduced) Neighbor Report Request/Response or a Beacon Report Request/Response. In this way, a STA may advertise, over a frequency band and on behalf of AP 105-a, parameters for communicating with AP 105-a to neighboring STAs, APs, or BSSs. In some cases, an AP 105-a may use a Neighbor Report Request or Neighbor Report Response to transmit the MB Wrapper IE or Neighbor Report IE.

Figure 3A:
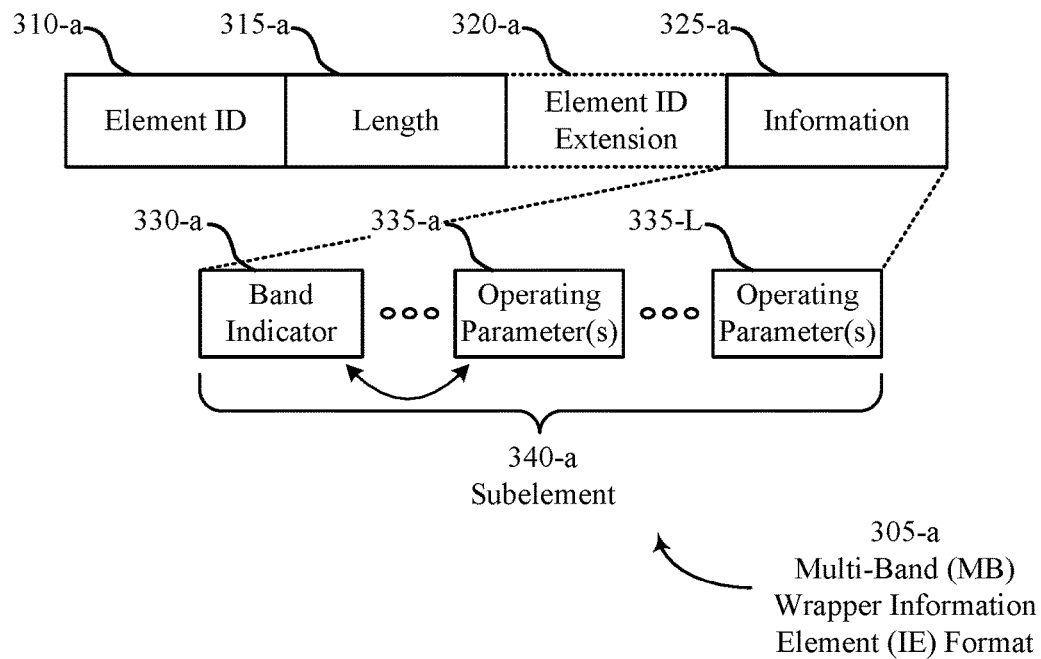
FIGS. 3A and 3B illustrate examples of an MB Wrapper IE format that supports signaling multi-band operating parameters in a wireless local area network (WLAN) in accordance with various aspects of the present disclosure.

FIG. 3A illustrates an example of an MB Wrapper IE format that supports signaling multi-band operating parameters in a WLAN in accordance with various aspects of the present disclosure. MB Wrapper IE format 305-a is an example of an MB Wrapper IE format. An AP 105 and STA 115 may use MB Wrapper IE format 305-a to communicate information between one another, as described above with reference to FIGS. 1-2.

MB Wrapper IE format 305-*a* may be used to convey information for associating and communicating with an AP on a frequency band other than the frequency band on which a transmission carrying an MB Wrapper IE is carried (or on which the transmission carrying an MB Wrapper IE is received). That is, MB Wrapper IE format 305-*a* may be used to convey parameters for associating and communicating with an AP on an external frequency band. MB Wrapper IE 305-*a* may include element ID field 310-*a*, length field 315-*a*, element ID extension field 320-*a*, and information field 325-*a*.

Element ID field 310-*a* may be used to convey a value identifying which information element is being transmitted or a type of the information element being transmitted. A receiving device may use the information in element ID field 310-*a* to identify the which information element is received. For example, the element ID: 255 may map to the MB Wrapper IE format 305-*a*, and element ID field 310-*a* may carry a binary representation of the value 255. A size of element ID field 310-*a* may be one octet.

Length field 315-*a* may be used to indicate a length of information field 325-*a* and may aid a receiving device in identifying the end of a transmitted MB Wrapper IE. In some examples, length field 315-*a* indicates an amount of time used for transmitting the information field 325-*a*. In other examples, length field 315-*a* indicates the number of octets carried in information field 325-*a*. A size of length field 315-*a* may be one octet.

Element ID extension field 320-*a*, in combination with element ID field 310-*a*, may be used to convey a combined value identifying the type of element being transmitted, and a receiving device may use the information in element ID field 310-*a* and element ID extension field 320-*a* to identify the type of element received. For example, the element ID extension: 1, in combination with the element ID: 255, may map to the MB Wrapper IE format 305-*a*, and element ID extension field 320-*a* may carry a binary representation of the value 1. Element ID extension field 320-*a* may optionally be included in MB Wrapper IE format 305-*a*, and an element ID field 310-*a* may be empty or a size of one octet.

Information field 325-*a* may be used to convey operating, or management, information, such as parameters for associating or communicating with a wireless device on one or more external frequency bands, along with an explicit indication of the one or more external frequency bands. For instance, information field 325-*a* may convey HE operating parameters for the 6 GHz frequency band, along with an explicit indication that the HE operating parameters are for the 6 GHz frequency band. Information field 325-*a* may include band indicator 330-*a* and one or more operating parameters 335.

Band indicator 330-*a* may be used to indicate which frequency band (e.g., an external frequency band) and/or channel is associated with the parameters for communicating over the indicated frequency band. Band indicator 330-*a* may be a band indicator field or an information element that carries information for identifying a band and for operating on the band (e.g., an MB IE, a Neighbor Report IE, and the like). An MB IE includes a Band ID field and a Channel Number field, and security fields, among others. In some cases, band indicator 330-*a* is located at a beginning of information field 325-*a*. In other cases, band indicator 330-*a* is not located at the beginning of information field 325-*a*— e.g., the location of band indicator 330-*a* may be swapped with the location of operating parameter 335-*a*. The location of band indicator 330-*a* in information field 325-*a* may be based on an element ID of band indicator 330-*a*. For example, band indicator 330-*a* and the operating parameters 335 may be arranged according to an increasing element ID order—e.g., band indicator 330-*a* may be associated with element ID 56; operating parameter 335-*a* may be associated with element ID 3; and operating parameter 335-L may be associated with element ID 8; where operating parameter 335-*a* is located at a beginning of information field 325-*a*, operating parameter 335-L follows operating parameter 335-*a*, and band indicator 330-*a* follows operating parameter 335-L.

Operating parameter 335-*a* may be used to indicate parameters for communicating over a particular frequency band (e.g., an external frequency band). Operating parameter 335-*a* may include an information element that conveys communication parameters for the particular frequency band. For example, operating parameter 335-*a* may include an HE operation information element that conveys HE operating parameters, BSS color information, a modulation and coding scheme, a number of spatial streams, and the like.

Subelement 340-*a* may be used to convey parameters for communicating with a transmitting device on an external frequency band, along with an explicit indication of the external frequency band. For instance, subelement 340-*a* may convey HE operating parameters for the 6 GHz frequency band, along with an explicit indication that the HE operating parameters are for the 6 GHz frequency band. Subelement 340-*a* may be composed of band indicator 330-*a* and the operating parameters, including operating parameter 335-*a*. MB Wrapper IE 305-*a* may include one or more subelements 340.

MB Wrapper IE Format 305-*a* may also include a bit or field indicating that the information carried in a generated MB Wrapper IE is complete for a particular frequency band, and that a STA may use the provided information to associate with an AP over the particular frequency band without performing additional discovery for the particular frequency band. This indication may be included within information field 325-*a* or within subelement 340-*a*.

In some examples, an AP generates an MB Wrapper IE according to MB Wrapper IE Format 305-*a*. The AP may generate element ID field 310-*a* using an element ID that identifies an MB Wrapper IE; length field 315-*a* based on the size of the information field 325-*a*, and element ID extension field 320-*a* based on the element ID field 310-*a*. The AP may generate subelement 340-*a* using operating information for a particular frequency band. For example, the AP may generate band indicator 330-*a* to indicate a 6 GHz band and may generate operating parameters 335-*a* through 335-L using information elements for communicating over the 6 GHz band. In some cases, the AP includes an indication in the MB Wrapper IE indicating that subelement 340-*a* carries complete information for communicating with the AP over the particular 6 GHz frequency band.

The AP may then transmit the MB Wrapper IE. In some cases, the AP may transmit or broadcast the MB Wrapper IE in a management frame over a first frequency. For example, the AP may transmit the MB Wrapper IE over the 5 GHz band.

A STA may receive the management frame over the 5 GHz band and may identify the MB Wrapper IE. The STA may then identify the operating information for communicating with the AP over the 6 GHz band. In some cases, the STA may associate with the AP over the 6 GHz band without performing additional discovery of the 6 GHz band. For example, the STA associates the AP over the 6 GHz band without performing additional discovery if the information carried in the MB Wrapper IE is complete or if the STA receives, either in the MB Wrapper IE or a field in the management frame, an indication that the information carried in the MB Wrapper IE for the 6 GHz band is complete.

Figure 3B:
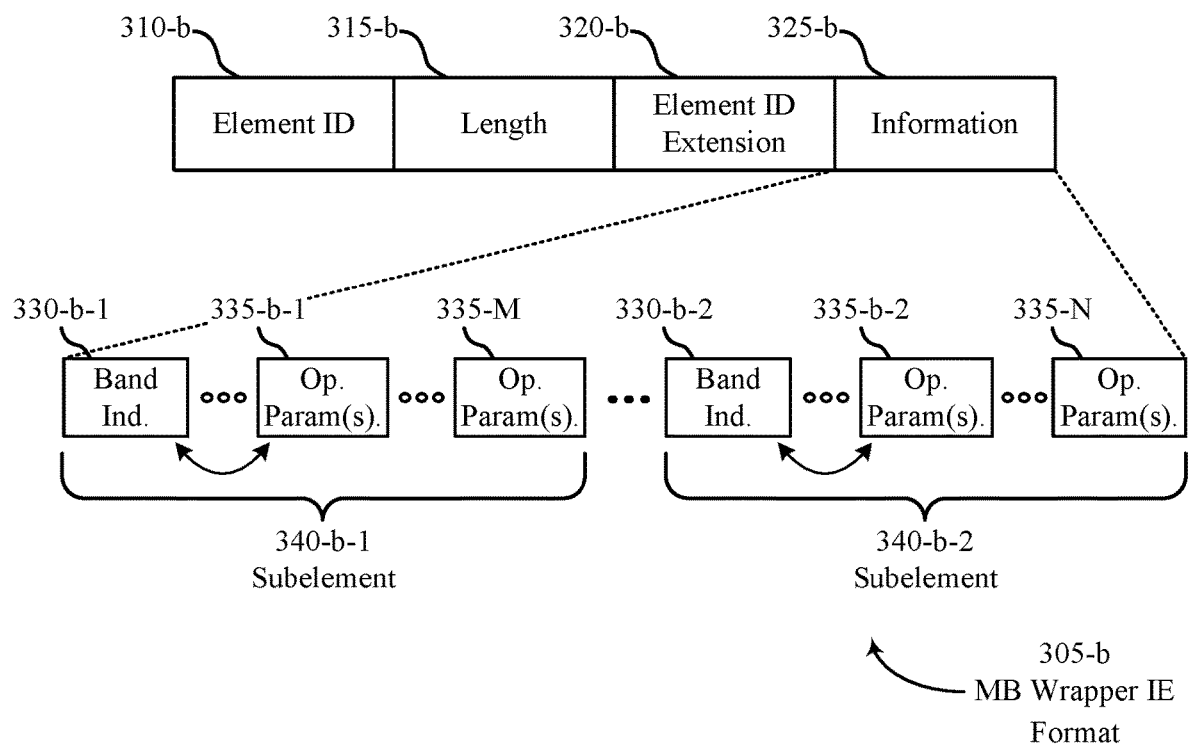

FIG. 3B illustrates an example of an MB Wrapper IE format 305-b that supports signaling multi-band operating parameters in a WLAN in accordance with various aspects of the present disclosure. MB Wrapper IE format 305-b is an example of an MB Wrapper IE format 305-a. An AP 105 and STA 115 may use MB Wrapper IE format 305-b to communicate information between one another, as described above with reference to FIGS. 1-2.

MB Wrapper IE format 305-b may be used to convey information for associating and communicating with an AP on one or more frequency bands other than the frequency band on which a transmission carrying an MB Wrapper IE is carried (or on which the transmission carrying an MB Wrapper IE is received). MB Wrapper IE 305-b may include element ID field 310-b, length field 315-b, element ID extension field 320-b, and information field 325-b.

Element ID field 310-b may be an example of Element ID field 310-a of FIG. 3A. Length field 315-b may be an example of length field 315-a of FIG. 3A. Element ID extension field 320-b may be an example of element ID extension field 320-a of FIG. 3A. Information field 325-b may be an example of information field 325-a of FIG. 3A. Band indicators 330-b-1 and 330-b-2 may be examples of band indicator 330-a of FIG. 3A. Operating parameters 335-b-1, 335-b-2, 335-M, and 335-N may be examples of operating parameters 335-a and 335-L of FIG. 3A. First subelement 340-b-1 and second subelement 340-b-2 may be examples of subelement 340-a of FIG. 3A.

Information field 325-b may be used to convey operating, or management, information for particular bands. Information field 325-b may include multiple subelements, including first subelement 340-b-1 and second subelement 340-b-2. First subelement 340-b-1 may indicate a first frequency band and may convey operating parameters for the first frequency band. First subelement 340-b-1 may include first band indicator 330-b-1 and operating parameters 335-b-1 through 335-M. Second subelement 340-b-2 may indicate a second frequency band and may convey operating parameters for the second frequency band. Second subelement 340-b-2 may include second band indicator 330-b-2 and operating parameters 335-b-2 through 335-N.

In some cases, band indicator 330-b-1 is located at a beginning of first subelement 340-b-1 and band indicator 330-b-2 is located at a beginning of second subelement 340-b-2. In such cases, a STA may delineate first subelement 340-b-1 from another subelement, such as second subelement 340-b-2, based on identifying a band indicator—i.e., a STA may determine that a subelement begins with band indicator 330-b-1 and ends with operating parameter 335-M positioned adjacent to band indicator 330-b-2.

In other cases, band indicator 330-b-1 and band indicator 330-b-2 are not located at the beginning of first subelement 340-b-1 or second subelement 340-b-2, respectively. Instead, the location of band indicator 330-b-1 and band indicator 330-b-2 in their respective subelements may be based on an element ID. For example, band indicator 330-b-1 and the operating parameters 335-b-1 to 335-M may be arranged according to an increasing element ID order— e.g., band indicator 330-b-1 may be associated with element ID 56; operating parameter 335-b-1 may be associated with element ID 3; and operating parameter 335-M may be associated with element ID 8; where operating parameter 335-b-1 is located at a beginning of subelement 340-b-1, operating parameter 335-M follows operating parameter 335-b-1, and band indicator 330-b-1 follows operating parameter 335-M {3; 8; 56}.

Also, band indicator 330-b-2 and operating parameters 335-b-2 to 335-N may be arranged according to an increasing element ID order—e.g., band indicator 330-b-1 may be associated with element ID 56; operating parameter 335-b-1 may be associated with element ID 7; and operating parameter 335-N may be associated with element ID 6; where operating parameter 335-N is located at a beginning of subelement 340-b-1, operating parameter 335-b-2 follows operating parameter 335-N, and band indicator 330-b-2 follows operating parameter 335-b-2 {6; 7; 56}. Together, first subelement 340-b-1 and second subelement 340-b-2 may have the following arrangement {3; 8; 56; 6; 7; 56}. In such cases, a STA may delineate first subelement 340-b-1 from another subelement, such as second subelement 340-b-2, based on identifying an out-of-order condition. For instance, the STA may identify that operating parameter 335-N has a lower element ID {6} than the element ID of the preceding band indicator 330-b-1 {56} and may identify that first subelement 340-b-1 includes information elements {3; 8; 56} and that second subelement 340-b-2 includes information elements {6; 7; 56}. The STA may similarly identify two subelements if an element ID is duplicated (e.g., {3; 8; 56; 56; 60; 61; 2; 56; 63} may be delineated as {3; 8; 56}, {56; 60; 61}, and {2; 56; 63}).

MB Wrapper IE Format 305-b may also include one or more bits or fields indicating that the information carried in a generated MB Wrapper IE is complete for a particular frequency band, and that a STA may use the provided information to associate with an AP over the particular frequency band without performing additional discovery for the particular frequency band. In some cases, MB Wrapper IE format 305-b may include a single bit or field to indicate that each subelement carries complete information for associating with the corresponding frequency band. In some cases, the indication may be included in each subelement 340 and may indicate whether the information in the subelement is complete for the frequency band associated with the subelement.

In some examples, an AP generates an MB Wrapper IE according to MB Wrapper IE Format 305-b. The AP may generate subelement 340-b-1 using operating information for a second frequency band and subelement 340-b-2 for a third frequency band. The AP may generate subelement 340-b-1 using operating information for a second frequency band and subelement 340-b-2 for the second frequency band. For example, the AP may generate band indicator 330-b-1 to indicate a 6 GHz band and may generate operating parameters 335-b-1 through 335-M using information elements for communicating over the 6 GHz band and a first channel and may generate band indicator 330-b-2 to indicate a 6 GHz band and may generate operating parameters 335-b-2 through 335-N using information elements for communicating over the 6 GHz band and a second channel. In some cases, the AP includes one or more indications in the MB Wrapper IE indicating that one or both subelement 340-b-1 and subelement 340-b-2 carry complete information for communicating with the AP over their respective frequency band.

The AP may then transmit the MB Wrapper IE. In some cases, the AP may transmit or broadcast the MB Wrapper IE over a first frequency. For example, the AP may transmit the MB Wrapper IE over the 5 GHz band.

A STA may receive the management frame over the 5 GHz band and may identify the MB Wrapper IE. The STA may then identify the operating information for communicating with the AP over the frequency bands indicated in subelement 340-*b*-1 and subelement 340-*b*-2. In some cases, the STA may associate with the AP over one of the indicated frequency bands without performing additional discovery. For example, if the information carried in subelement 340-*b*-1 is complete, the AP may associate with the AP over the frequency band that corresponds to subelement 340-*b*-1.

Figure 3C:
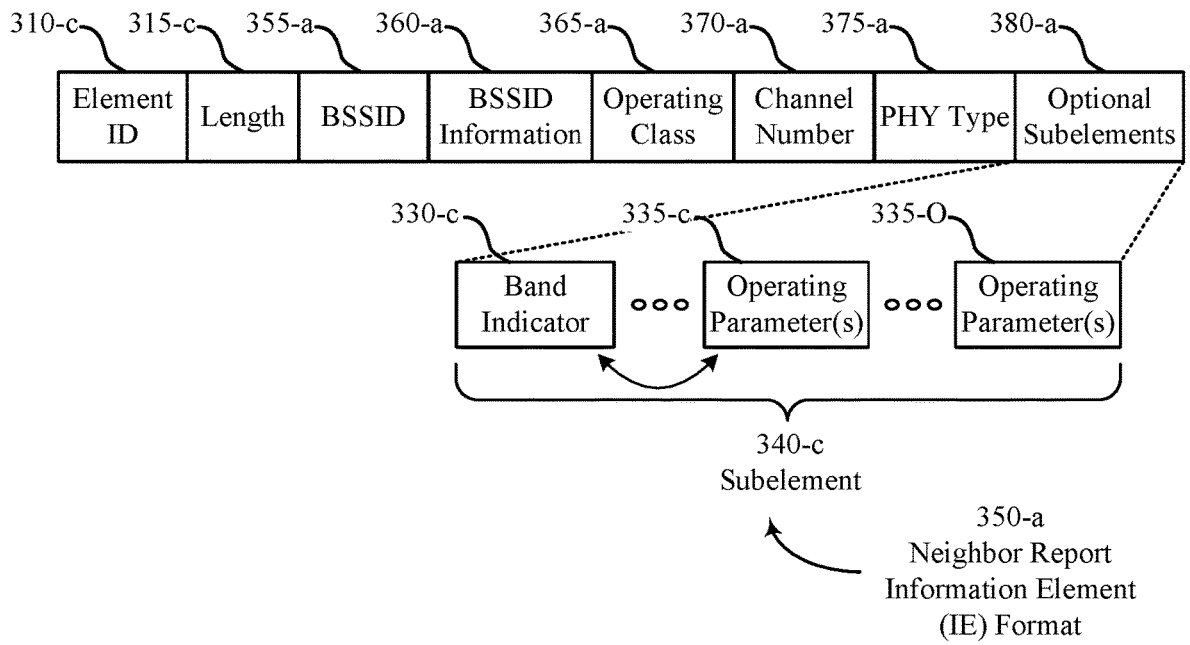
FIGS. 3C and 3D illustrate examples of a Neighbor Report IE format that supports signaling multi-band operating parameters in a wireless local area network (WLAN) in accordance with various aspects of the present disclosure.
Figure 3D:
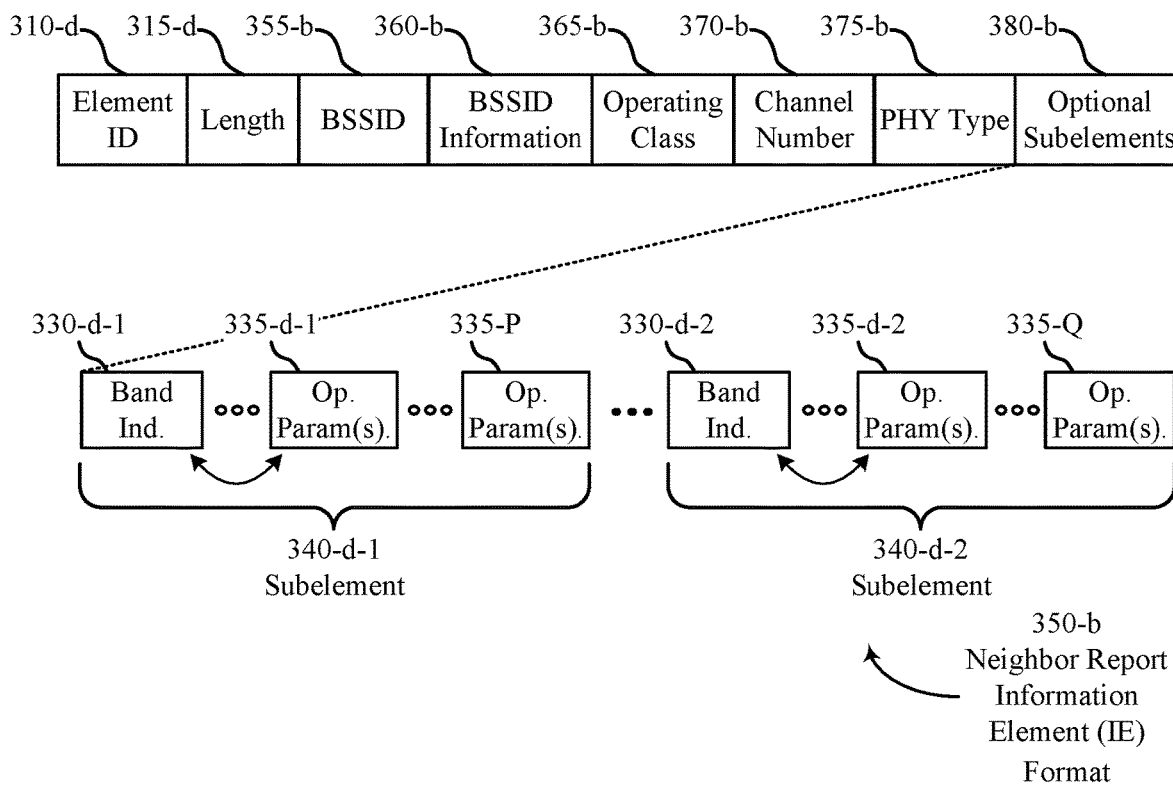

FIGS. 3C and 3D illustrate examples of a Neighbor Report IE 350-*a* and a Neighbor Report IE 350-*b*, respectively, that carry the same or similar multi-band subelements described with respect to the MB Wrapper IE illustrated in FIGS. 3A and 3B. Each of Neighbor Report IE 350-*a* and Neighbor Report IE 350-*b* includes an element ID field 310-*c* or 310-*d*, a length field 315-*c* or 315-*d*, a BSSID field 355-*a* or 355-*b*, a BSSID information field 360-*a* or 360-*b*, an operating class field 365-*a* or 365-*b*, a channel number field 370-*a* or 370-*b*, a PHY type field 375-*a* or 375-*b*, and an optional subelements field 380-*a* or 380-*b*. Element ID field 310-*c* or 310-*d* identifies the IE as a Neighbor Report IE 350. Length field 315-*c* or 315-*d* may indicate a length of a Neighbor Report IE conforming to Neighbor Report IE format 350-*a* or Neighbor Report IE format 350-*b*. BSSID field 355-*a* or 355-*b* indicates a BSSID of a BSS to which this Neighbor Report applies. The BSSID may refer to a BSS collocated with the AP transmitting the Neighbor Report IE or to a different BSS. Operating class field 365-*a* or 365-*b*, the channel number 370-*a* or 370-*b*, and the PHY type field 375-*a* or 375-*b* indicate the operating class, channel number, and PHY type of the indicated BSS, respectively. Optional subelements field 380-*a* may include one or more subelements 340-*c*, 340-*d*-1, or 340-*d*-2 similar to the subelements described with respect to FIGS. 3A and 3B.

Figure 4:
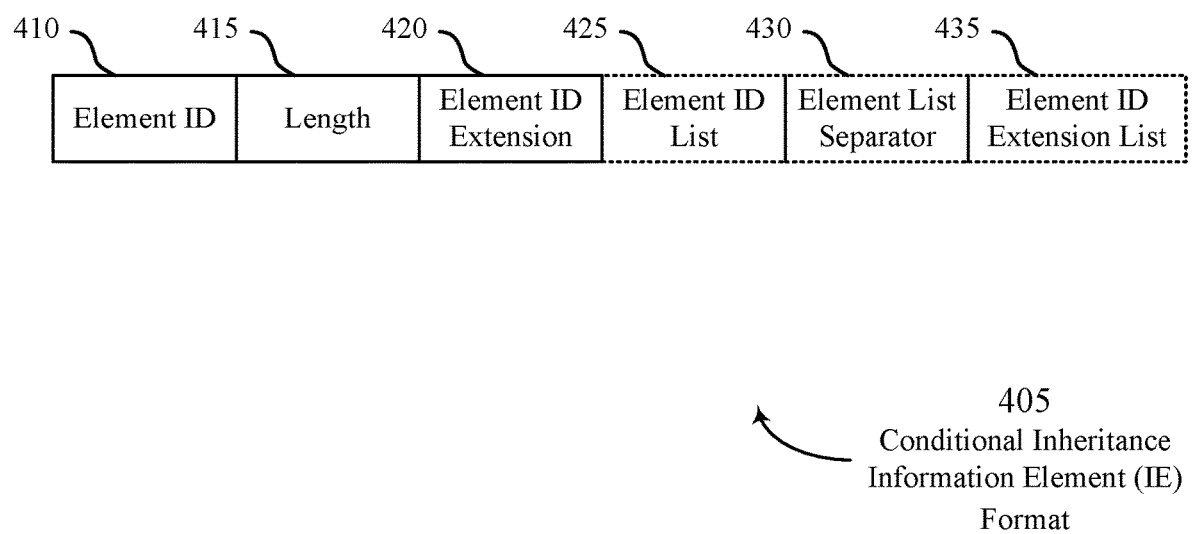
FIG. 4 illustrates an example of a conditional inheritance IE format that supports signaling multi-band operating parameters in a WLAN in accordance with various aspects of the present disclosure.

FIG. 4 illustrates an example of a conditional inheritance IE format 405 that supports signaling multi-band operating parameters in a WLAN in accordance with various aspects of the present disclosure. Conditional inheritance IE format 405 is an example of a conditional inheritance IE format. An AP 105 and STA 115 may use Conditional Inheritance IE format 405 to communicate information between one another, as described above with reference to FIGS. 1-3.

Conditional inheritance IE format 405 may be used to indicate which parameters for operating in an external frequency band (e.g., an external frequency band indicated in an MB Wrapper IE or Neighbor Report IE) will be inherited from the frequency band used to transmit conditional inheritance IE format 405. Conditional inheritance IE format 405 may include element ID field 410, length field 415, element ID extension field 420, element ID list field 425, element list separator field 430, and element ID extension list field 435.

Element ID field 410 may be an example of element ID field 310 as discussed with reference to FIGS. 3A and 3B. Length field 415 may be an example of length field 315 as discussed with reference to FIGS. 3A and 3B. Element ID extension field 420 may be an example of element ID extension field 320 as discussed with reference to FIGS. 3A and 3B. Each of element ID field 410, length field 415, and element ID extension field 420 may have a size of one octet.

Element ID list field 425 may be used to list which operating parameters will not be inherited from a current frequency band for communications over one or more external frequency bands. In some cases, element ID list field 425 includes element ID values of information elements that are present in a management frame of a transmitted BSSID (e.g., over the frequency band used to transmit the management frame) but not inherited by the non-transmitted BSSID (e.g., over another frequency band) that includes the information element. Alternatively, element ID list field 425 may be used to list which communication parameters will be inherited from a current frequency band for communications over one or more external frequency bands. Element ID list field 425 is optional, and a size of element ID list field 425 may be variable—e.g., based on the number of element IDs included in the element ID list field 425—where each listed element ID may be one octet in length.

Element list separator field 430 may be conditionally present when element ID extension list field 435 is present. When element ID extension list field 435 is present, element list separator field 430 may be set to a certain value (e.g., 255). A size of element list separator field 430 may be empty or a size of one octet.

Element ID extension list field 435 may be used in combination with element ID list field 425 to list which operating parameters will not be inherited from a current frequency band. In some cases, element ID extension list field 435 includes an element ID extension corresponding to the information elements listed in element ID list field 425 that are present in the management frame of the transmitted BSSID (e.g., over the frequency band used to transmit the management frame) but not inherited by the non-transmitted BSSID (e.g., over another frequency band) that includes the information element. Element ID extension list field 435 is optional, and a size of element ID extension list field 435 may be variable—e.g., based in part on the number of element IDs included in element ID list field 425.

In some examples, an AP generates a Conditional Inheritance IE according to Conditional Inheritance IE Format 405. The AP may generate: element ID field 410 using an element ID that identifies a Conditional Inheritance IE; length field 415 based on the size of the element ID list field 425, element list separator field 430, and element ID extension list field 435; and element ID extension field 420 based on element ID field 410. The AP may generate element ID list field 425 based on a number of information elements for a first frequency band to be inherited by another frequency band. For example, the AP may indicate that the content of an HE Operation IE for a first frequency band is to be inherited by another frequency band.

The AP may then transmit the Conditional Inheritance IE. In some cases, the AP may transmit or broadcast the Conditional Inheritance IE in a management frame over a first frequency. A STA may receive the Conditional Inheritance IE and may determine which operating parameters are listed by mapping the element ID values listed in the element ID list field 425 and/or element ID extension list field 435 to known information elements. The STA may then determine which information elements are to be inherited for communications over other frequency bands and may use the corresponding information elements for the first frequency band for communications over the other frequency bands.

Alternatively, the AP may generate element ID list field 425 based on a number of information elements for a first frequency band to not be inherited by another frequency band. The AP may transmit the Conditional Inheritance IE, and the STA may determine which operating parameters are not to be inherited from the first frequency band based on the information element listed in element ID list field 425 and/or element ID extension list field 435.

Figure 5:
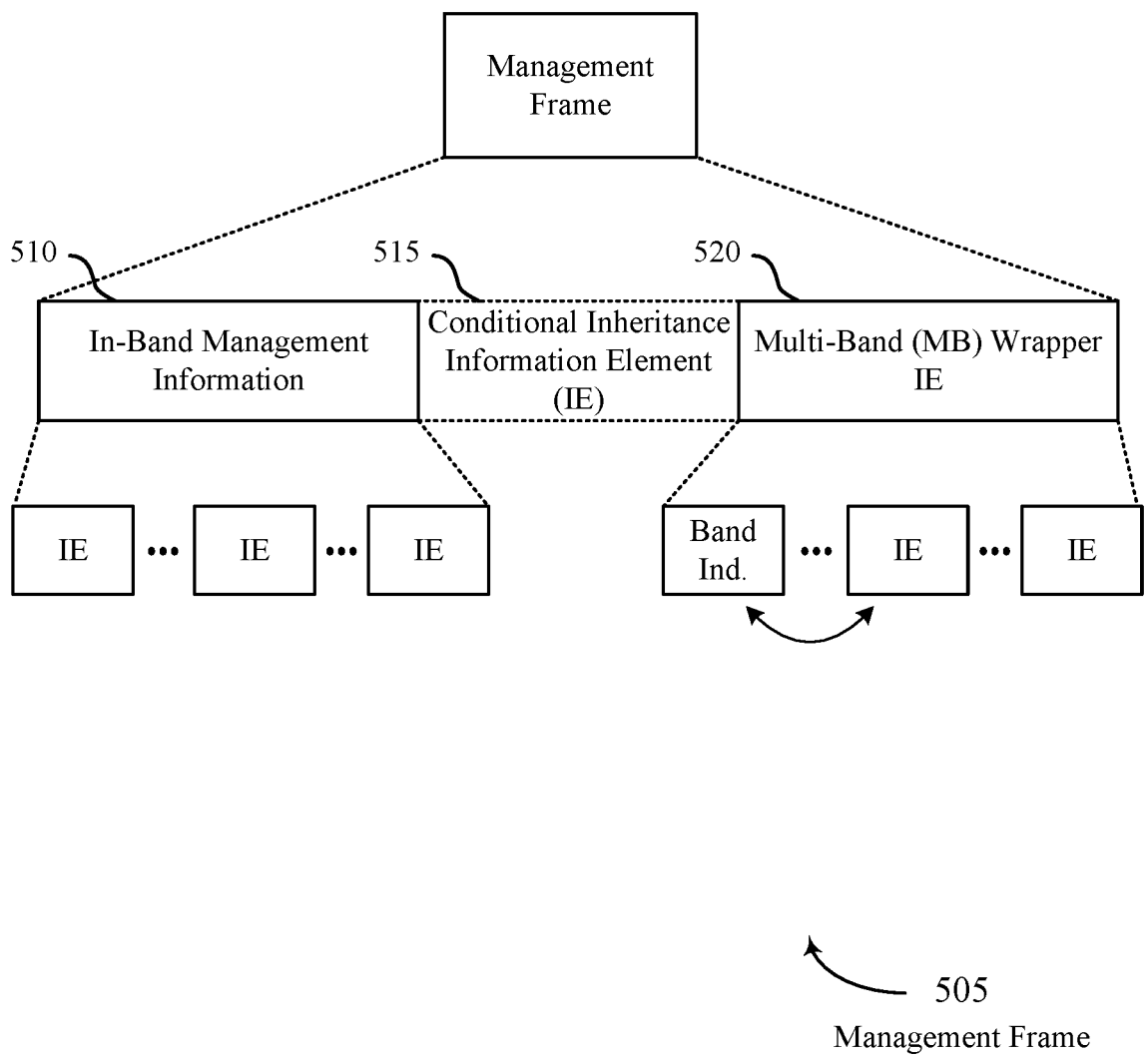
FIG. 5 illustrates an example of a management frame that supports signaling multi-band operating parameters in a WLAN in accordance with various aspects of the present disclosure.

FIG. 5 illustrates an example of a management frame 505 that supports signaling multi-band operating parameters in a WLAN in accordance with various aspects of the present disclosure. Management frame 505 is an example of a management frame. An AP 105 and STA 115 may use management frame 505 to communicate information between one another, as described above with reference to FIGS. 1-4.

Management frame 505 may be used to transmit operating parameters for one or more frequency bands. Management frame 505 may include in-band management information 510, Conditional Inheritance IE 515, and MB Wrapper IE 520. In some cases, management frame 505 may include multiple Conditional Inheritance IEs and MB Wrapper IEs, such as Conditional Inheritance IE 515 and MB Wrapper IE 520. In some cases, a Neighbor Report IE may be used in place of MB Wrapper IE 520

In-band management information 510 may carry operating parameters for the frequency band over which management frame 505 is transmitted (or "the operating band"). For example, in-band management information may carry information elements that convey information for associating and communicating with the transmitting device over the operating band.

Conditional Inheritance IE 515 may be used to indicate which operating parameters conveyed for the operating band are to be inherited for communications over one or more other frequency bands. Conditional Inheritance IE 515 is optional, and in some cases, may be included within MB Wrapper IE 520. In some cases, a Conditional Inheritance IE, such as Conditional Inheritance IE 515, may be included in each subelement of MB Wrapper IE 520. In some cases, a single Conditional Inheritance IE, such as Conditional Inheritance IE 515, may be included in MB Wrapper IE 520.

MB Wrapper IE 520, or alternatively, a Neighbor Report IE, may be used to convey operating parameters for one or more frequency bands other than the operating band. The contents of MB Wrapper IE 520 or the Neighbor Report IE may be based on the information conveyed in Conditional Inheritance IE 515. For example, information elements that are identified as being inherited from the operating band may be excluded from MB Wrapper IE 520 or the Neighbor Report IE. MB Wrapper IE 520 or the Neighbor Report IE may be generated according to MB Wrapper IE Format 305-*a* of FIG. 3A, MB Wrapper IE Format 305-*b* of FIG. 3B, Neighbor Report IE Format 350-*a* of FIG. 3C, or Neighbor Report IE Format 350-*b* of FIG. 3D.

In one example, an AP generates management frame 505. The AP may generate in-band management information 510. In-band management information 510 may include information elements conveying information for a first frequency band, such as the 2.4 GHz band. The AP may also generate Conditional Inheritance IE 515 to inform receiving devices that certain information elements included in in-band management information 510 are to be inherited and/or not to be inherited for communications over other frequency bands. For example, the AP may indicate that a first set of information elements (e.g., an HE Operation IE, an EDCA IE, etc.) for the first frequency band are to be inherited for communications over one or more frequency bands indicated in MB Wrapper IE 520 or Neighbor Report IE. The AP may generate MB Wrapper IE 520 or Neighbor Report IE in management frame 505 to convey operating parameters for the one or more frequency bands. The AP may omit certain information elements from the MB Wrapper IE 520 or Neighbor Report IE for one or more subelements based on the contents of Conditional Inheritance IE 515. The AP may transmit or broadcast the management frame over the 2.4 GHz band.

A STA may receive the management frame and may identify operating parameters for respective frequency bands. For example, the STA may identify a first set of operating parameters for a particular frequency band based on a subelement included in MB Wrapper IE 520 or the Neighbor Report IE. The STA may also identify a second set of operating parameters based on in-band management information 510. The STA may then identify a third set of operating parameters based on Conditional Inheritance IE 515. For example, the third set of operating parameters may include the second set of operating parameters and one or more inherited parameters from the in-band management information 510. In cases when Conditional Inheritance IE 515 is not present in management frame 505, the STA may identify inherited parameters as previously discussed in FIG. 2.

Figure 6:
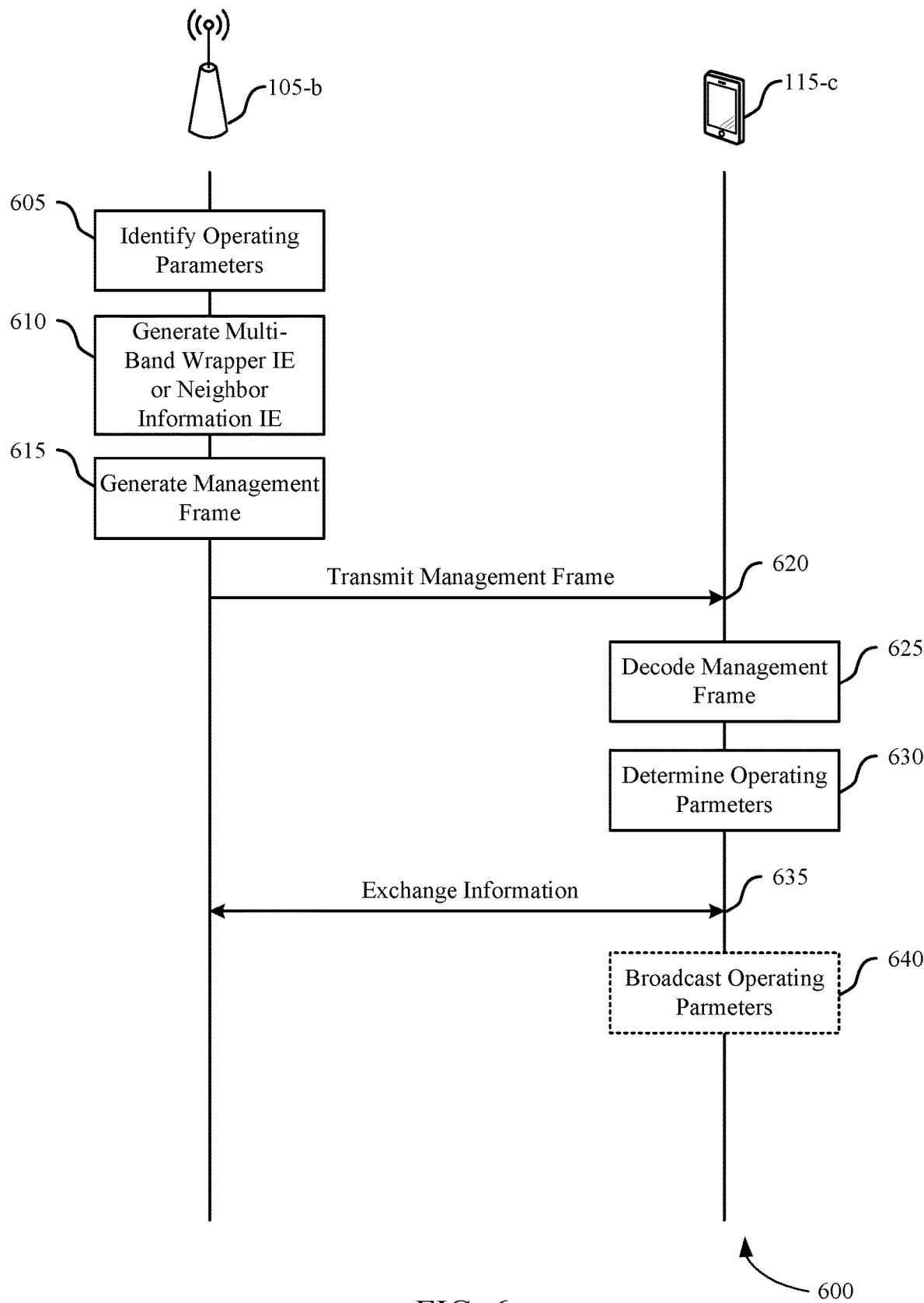
FIG. 6 illustrates an example of a process flow for signaling multi-band operating parameters in a WLAN in accordance with various aspects of the present disclosure.

FIG. 6 illustrates an example of a process flow 600 for signaling multi-band operating parameters in a WLAN in accordance with various aspects of the present disclosure. Process flow 600 may be performed by an AP 105-*b* and STA 115-*c*, which may be an example of an AP 105 and STA 115 described above with reference to FIGS. 1-2. In some examples, AP 105-*b* may advertise operating parameters for one or more frequency bands.

At 605, AP 105-*b* may identify operating parameters for one or more frequency bands. In some cases, AP 105-*b* may identify first operating parameters for a first frequency band, second operating parameters for a second frequency band, and so on. In some examples, the first frequency band is an operating band (e.g., the 5 GHz band) and the second frequency band is an alternate band (e.g., 6 GHz). The operating parameters may include one or more information elements conveying information for associating and/or communicating with AP 105-*b* over a particular frequency band. In some cases, operating parameters of the different frequency band may share one or more common information elements.

At 610, AP 105-*b* may generate one or more multi-band information elements. AP 105-*b* may generate an MB Wrapper IE or Neighbor Report IE based on the identified operating parameters. For instance, AP 105-*b* may generate MB Wrapper IE or Neighbor Report IE to include one or more subelements, each subelement including operating parameters for a particular frequency band and an indication of the particular frequency band. In some cases, AP 105-*b* generates the MB Wrapper IE or Neighbor Report IE based on the common information elements identified above. For instance, AP 105-*b* may exclude or abbreviate the common information elements from one or more subelements. In some cases, AP 105-*b* may include the common information element in a subelement if the content of the common information element for the first frequency band is different than the content of the common information element for the frequency band corresponding to the subelement.

In some cases, AP 105-*b* may also generate an indication that the information included in one or more subelements is complete—i.e., an indication that the device that decodes the subelement may associate with AP 105-*b* over the corresponding frequency band without performing further information gathering. AP 105-*b* may include the indication in the MB Wrapper IE or Neighbor Report IE. In some cases, AP 105-*b* may include a single indication in the MB Wrapper IE or the Neighbor Report IE to indicate that each subelement carries complete information. In other cases, AP 105-*b* may include an indication in each subelement indicating whether a subelement carries complete information for a corresponding frequency band.

AP 105-*b* may also generate a Conditional Inheritance IE based on the operating parameters identified above. For instance, AP 105-*b* may determine which of the first operating parameters for the first frequency band are to be inherited by the other frequency band. AP 105-*b* may then generate the Conditional Inheritance IE to include a list of information elements corresponding to the operating parameters to be inherited. Alternatively, AP 105-*b* may then generate the Conditional Inheritance IE to include a list of information elements corresponding to the operating parameters to not be inherited. Similar to the above, AP 105-*b* may exclude or abbreviate information elements included in one or more subelements based on the information elements listed in the Conditional Inheritance IE.

At 615, AP 105-*b* generates a management frame including operating information for an operating band, the MB Wrapper IE or Neighbor Report IE, and/or the Conditional Inheritance IE (if present).

At 620, AP 105-*b* transmits the management frame over the operating band to STA 115-*c*. In some cases, AP 105-*b* broadcasts the management frame over the operating band. STA 115-*c* may receive the transmitted or broadcasted management frame.

At 625, STA 115-*c* may decode the management frame. Decoding the management frame may include identifying the operating parameters for the operating band, the MB Wrapper IE or Neighbor Report IE, and/or the Conditional Inheritance IE.

At 630, STA 115-*c* may determine the operating parameters for the operating band and the operating parameters for each of the frequency bands signaled in the MB Wrapper IE or Neighbor Report IE. Identifying the operating parameters may include identifying a first set of information elements for the operating band, a second set of information elements for a second frequency band, and so on. In some cases, STA 115-*c* may determine a first set of operating parameters for the operating band and a second set of parameters for an alternate band. In some cases, STA 115-*c* may inherit one or more operating parameters from the operating band for the alternate bands based on inheritance rules, as discussed in FIG. 2, and/or based on the information elements listed in the Conditional Information IE.

In some cases, STA 115-*c* may determine that the operating parameters carried in a subelement are complete for the corresponding frequency band. In some cases, STA 115-*c* may determine that one or more subelements carry complete operating information based on receiving an indication that the subelements carry complete operating information.

At 635, STA 115-*c* may begin communicating with AP 105-*b* over one or more alternate band based on the received operating parameters. In some cases, after determining the operating parameters, STA 115-*c* may associate and communicate with AP 105-*b* without performing additional discovery. For instance, STA 115-*c* may begin communicating with AP 105-*b* over a second frequency band using the operating parameters carried in a second subelement based on determining that the operating parameters carried in the second subelement are complete.

At 640, STA 115-*c* may optionally broadcast the operating parameters for the one or more frequency bands on behalf of AP 105-*b*. For example, STA 115-*c* may broadcast the operating parameters for the one or more frequency band in a Neighbor Report Request/Response. In this way, AP 105-*b* may indirectly reach additional STAs, APs, and/or BSSs.

Figure 7:
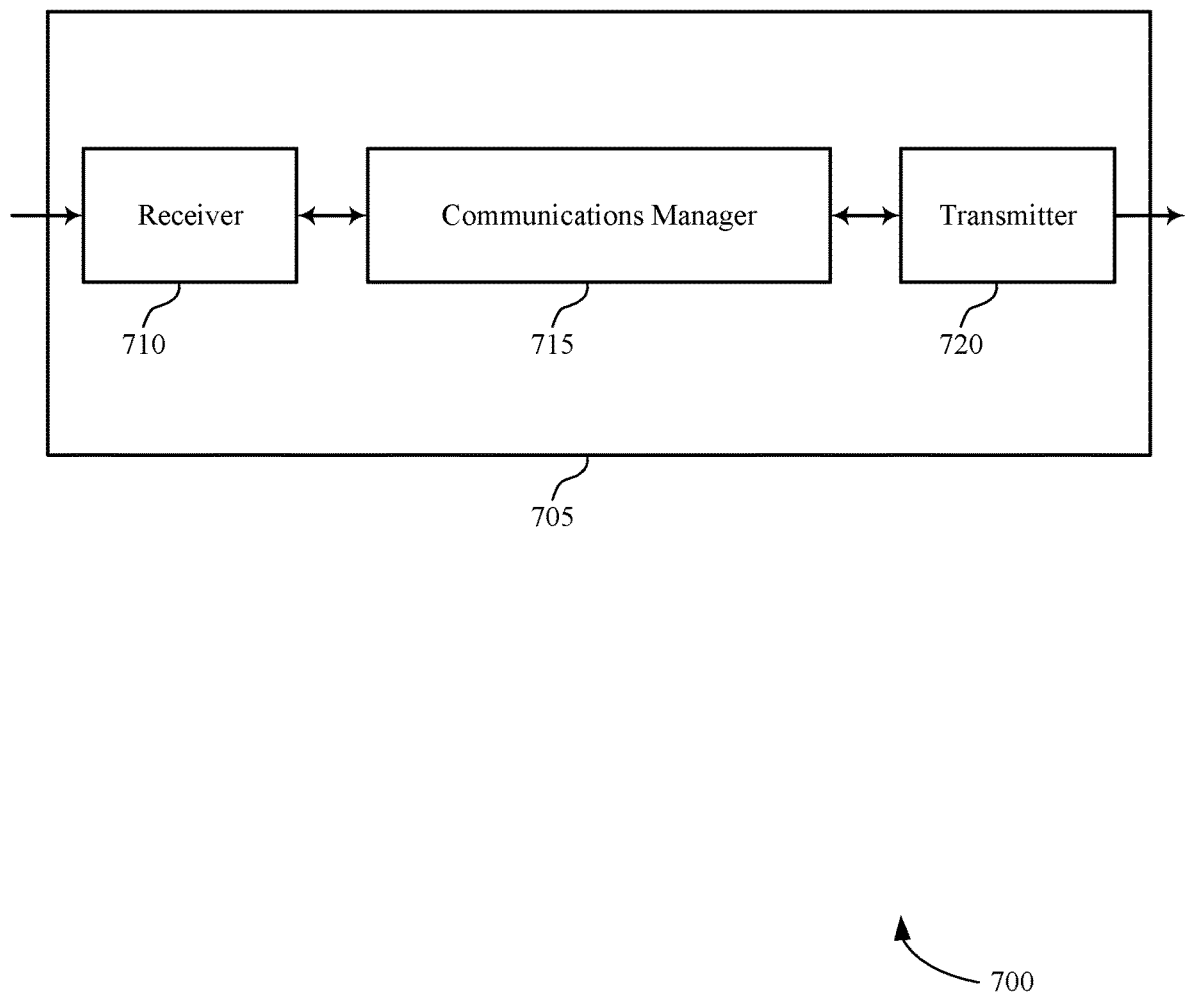
FIGS. 7 and 8 show block diagrams of devices that support signaling multi-band operating parameters in a WLAN in accordance with aspects of the present disclosure.

FIG. 7 shows a block diagram 700 of a device 705 that supports signaling multi-band operating parameters in a WLAN in accordance with aspects of the present disclosure. The device 705 may be an example of aspects of a device as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to signaling multi-band operating parameters in a WLAN, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may identify a set of operating parameters for one or more frequency bands supported by a first wireless device. The communications manager 715 may also generate a multi-band wrapper information element or a neighbor report information element including one or more subelements. Each subelement may include an indication of a frequency band of the one or more frequency bands and operating parameters associated with the frequency band. The communications manager 715 may also generate a management frame including the multi-band wrapper information element. The communications manager 715 may be an example of aspects of the communications manager 910 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 920 described with reference to FIG. 9. The transmitter 720 may utilize a single antenna or a set of antennas. The transmitter 720 may transmit the management frame to a second wireless device.

In some examples, the communications manager 715 may be implemented as a wireless modem chipset, and the transmitter 720 and the receiver 710 may be implemented as a set of analog components (e.g., amplifiers, filters, phase shifters, etc.) that are controlled by the communications manager 715 to transmit and receive signals, respectively. The communications manager 715 may couple with the receiver 710 over a receive interface and with the transmitter 720 over a transmit interface.

Figure 8:
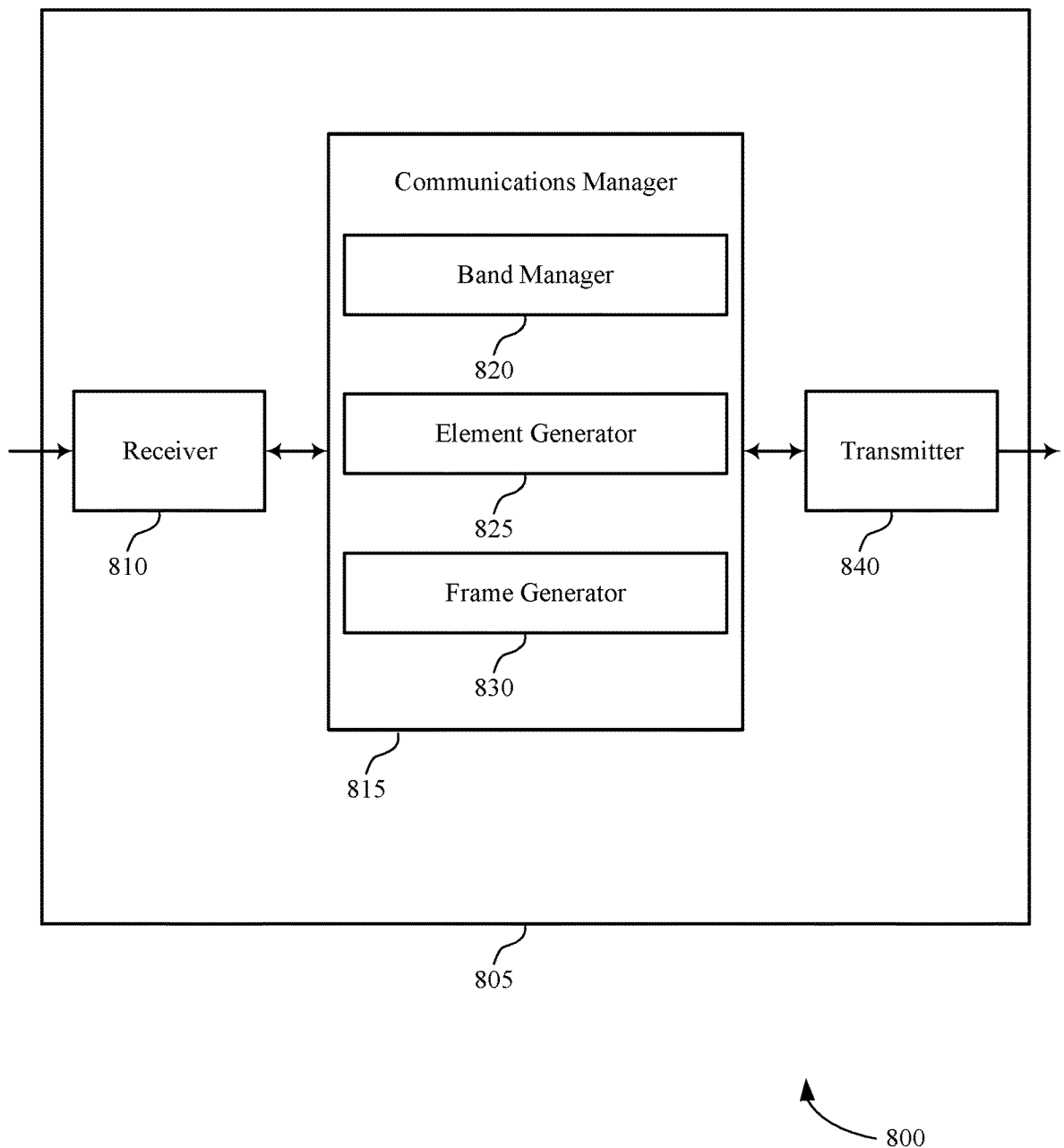

FIG. 8 shows a block diagram 800 of a device 805 that supports signaling multi-band operating parameters in a WLAN in accordance with aspects of the present disclosure. The device 805 may be an example of aspects of a device 705 or an AP 105 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to signaling multi-band operating parameters in a WLAN, etc.). Information may be passed on to other components of the device 805. The receiver 810 may be an example of aspects of the transceiver 920 described with reference to FIG. 9. The receiver 810 may utilize a single antenna or a set of antennas. In some cases, the receiver 810 may receive from a second wireless device a second multi-band wrapper information element corresponding to a third wireless device.

The communications manager 815 may be an example of aspects of the communications manager 715 as described herein. The communications manager 815 may include a band manager 820, an element generator 825, and a frame generator 830. The communications manager 815 may be an example of aspects of the communications manager 910 described herein.

The band manager 820 may identify a set of operating parameters for one or more frequency bands supported by a first wireless device. In some examples, band manager 820 may negotiate, over the first frequency band, an acknowledgement procedure for communications with the second wireless device over on a different frequency band of the one or more frequency bands. In some examples, band manager 820 may negotiate, over the first frequency band, a security key for communicating with the second wireless device on a different frequency band of the one or more frequency bands. In some examples, band manager 820 may identify a transmission of an information element for the first frequency band.

Element generator 825 may generate a multi-band wrapper information element or a neighbor report information element including one or more subelements. Each subelement may include an indication of a frequency band of the one or more frequency bands and operating parameters associated with the frequency band. In some cases, the operating parameters associated with the frequency band include access mechanism parameters, timing parameters, or transmission parameters, or any combination thereof. In some cases, the one or more subelements include a set of subelements, each subelement being associated with a different frequency band. In some cases, the one or more subelements include a set of subelements, each subelement including a set of information elements associated with a frequency band. In some cases, the one or more subelements include multi-band information elements, each multi-band information element including an indication of a frequency band of the one or more frequency bands.

In some examples when generating the multi-band wrapper information element or the neighbor report information element, element generator 825 may generate an information field including the one or more subelements, where the information field includes a variable length. In some examples when generating the multi-band wrapper information element or the neighbor report information element, element generator 825 may generate a length field including an indication of a length of the information field. In some examples when generating the multi-band wrapper information element or the neighbor report information element, element generator 825 may generate a control field within the information field, where the control field indicates the frequency band of a given subelement of the multi-band wrapper information element or the neighbor report information element. In some examples when generating the multi-band wrapper information element or the neighbor report information element, element generator 825 may generate an indication that the second wireless device can associate with the first wireless device over a frequency band of the one or more frequency bands without performing a scanning or probing operation.

In some examples, element generator 825 may order the set of information elements within each subelement so that the information element indicating the frequency band is located at a beginning of the set of information elements. In some examples, element generator 825 may order the set of information elements within each subelement based on an element identifier value of each information element. In some examples, element generator 825 may delineate between the one or more subelements of the multi-band wrapper information element or the neighbor report information element based on an out-of-order condition between adjacent information elements in the multi-band wrapper information element or the neighbor report information element.

In some examples, element generator 825 may inherit information elements from another frequency band by omitting an information element from a subelement of the multi-band wrapper information element or the neighbor report information element based on a transmission of the information element for the first frequency band. In some examples, element generator 825 may generate an empty information field for a subelement of the multi-band wrapper information element or the neighbor report information element based on a transmission of a corresponding information element for the first frequency band. In some cases, a presence of the empty information field indicates that the corresponding information element is to be inherited by a subelement. In some examples, element generator 825 may not inherit information elements from another frequency band by including the information element in a subelement of the multi-band wrapper information element or the neighbor report information element based on a content of the information element for the first frequency band being different than a content of the information element for a frequency band for the subelement. In some cases, a presence of the empty information field indicates that the corresponding information element is to not be inherited by a subelement.

In some examples, element generator 825 may generate a conditional inheritance information element indicating one or more information elements of the first frequency band to not be inherited for communications over the one or more frequency bands. In some examples, element generator 825 may generate an information element for a subelement of the multi-band wrapper information element or the neighbor report information element based on the conditional inheritance information element identifying the information element. In some examples, element generator 825 may generate a conditional inheritance information element indicating one or more information elements of the first frequency band to be inherited for communications over the one or more frequency bands. In some examples, element generator 825 may omit an information element for a subelement of the multi-band wrapper information element or the neighbor report information element based on the conditional inheritance information element identifying the information element.

Frame generator 830 may generate a management frame including the multi-band wrapper information element or the neighbor report information element.

The transmitter 840 may transmit signals generated by other components of the device 805. In some examples, the transmitter 840 may be collocated with a receiver 810 in a transceiver module. For example, the transmitter 840 may be an example of aspects of the transceiver 920 described with reference to FIG. 9. The transmitter 840 may utilize a single antenna or a set of antennas. The transmitter 840 may transmit the management frame to a second wireless device. In some cases, the management frame is transmitted over a first frequency band.

In some examples, the communications manager 815 may be implemented as a wireless modem chipset, and the transmitter 840 and the receiver 810 may be implemented as a set of analog components (e.g., amplifiers, filters, phase shifters, etc.) that are controlled by the communications manager 815 to transmit and receive signals, respectively. The communications manager 815 may couple with the receiver 810 over a receive interface and with the transmitter 840 over a transmit interface.

Figure 9:
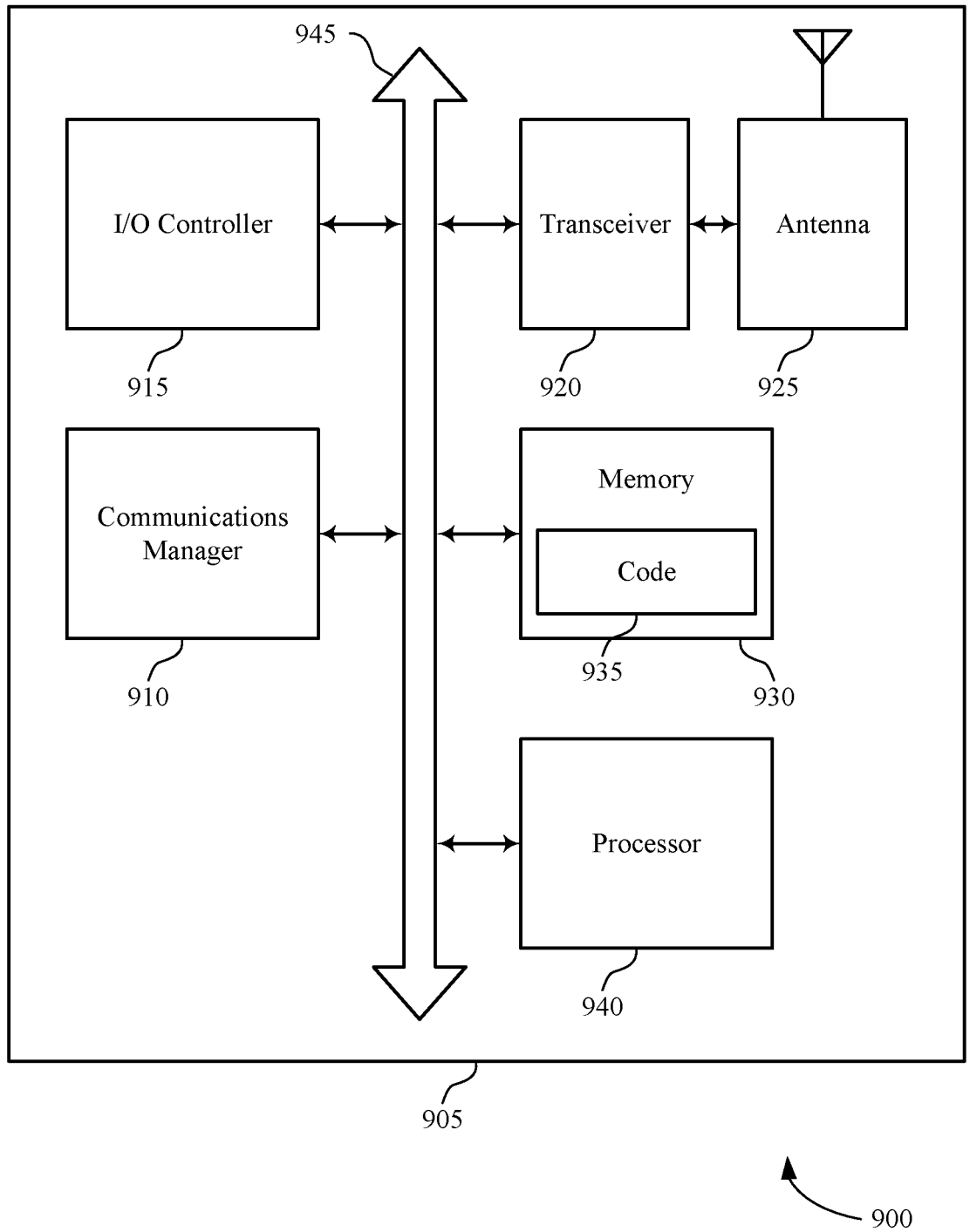
FIG. 9 shows a diagram of a system including a device that supports signaling multi-band operating parameters in a WLAN in accordance with aspects of the present disclosure.

FIG. 9 shows a diagram of a system 900 including a device 905 that supports signaling multi-band operating parameters in a WLAN in accordance with aspects of the present disclosure. The device 905 may be an example of or include the components of device 705, device 805, or a device as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may be an example of communications managers 715 or 815 as discussed with reference to FIG. 7 or 8.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting signaling multi-band operating parameters in a WLAN).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
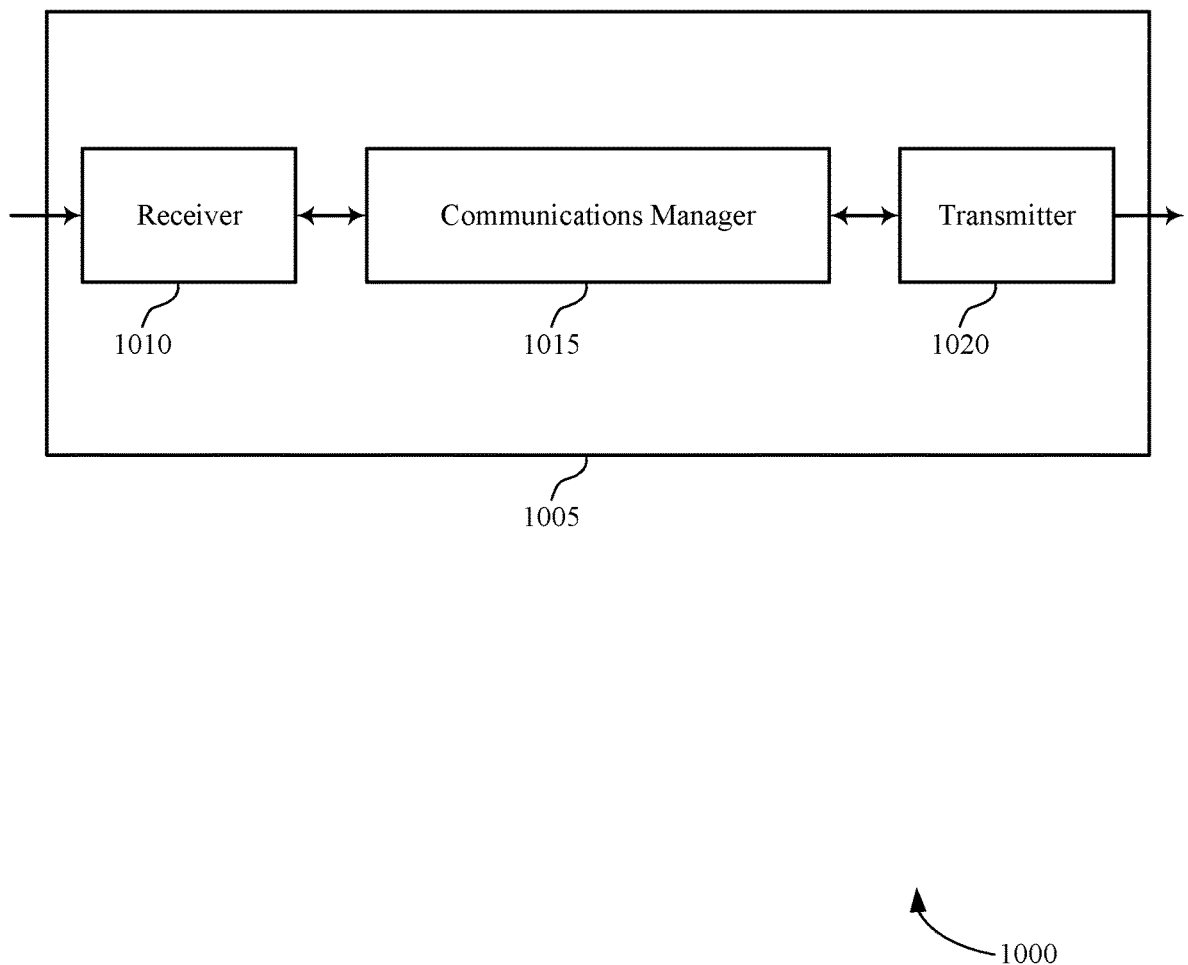
FIGS. 10 and 11 show block diagrams of devices that support signaling multi-band operating parameters in a WLAN in accordance with aspects of the present disclosure.

FIG. 10 shows a block diagram 1000 of a device 1005 that supports signaling multi-band operating parameters in a WLAN in accordance with aspects of the present disclosure. The device 1005 may be an example of aspects of a STA as described herein. The device 1005 may include a receiver 1010, a communications manager 1015, and a transmitter 1020. The device 1005 may also include a processor. Each of these components may be in communication with one another (e.g., via one or more buses).

Receiver 1010 may receive information such as packets, user data, or control information associated with various information channels (e.g., control channels, data channels, and information related to signaling multi-band operating parameters in a WLAN, etc.). Information may be passed on to other components of the device. The receiver 1010 may be an example of aspects of the transceiver 1220 described with reference to FIG. 12. The receiver 1010 may utilize a single antenna or a set of antennas.

The communications manager 1015 may receive, from a first wireless device, a management frame including a multi-band wrapper information element or a neighbor report information element including one or more subelements. Each subelement may include an indication of a frequency band of one or more frequency bands and operating parameters associated with the frequency band. The communications manager 1015 may also identify information for performing communications over one or more indicated frequency bands of the one or more frequency bands based on the multi-band wrapper information element or the neighbor report information element. The communications manager 1015 may also communicate over the one or more indicated frequency bands based on identifying the information for performing communications. The communications manager 1015 may be an example of aspects of the communications manager 1210 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1220 described with reference to FIG. 12. The transmitter 1020 may utilize a single antenna or a set of antennas.

In some examples, the communications manager 1015 may be implemented as a wireless modem chipset, and the transmitter 1020 and the receiver 1010 may be implemented as a set of analog components (e.g., amplifiers, filters, phase shifters, etc.) that are controlled by the communications manager 1015 to transmit and receive signals, respectively. The communications manager 1015 may couple with the receiver 1010 over a receive interface and with the transmitter 1020 over a transmit interface.

Figure 11:
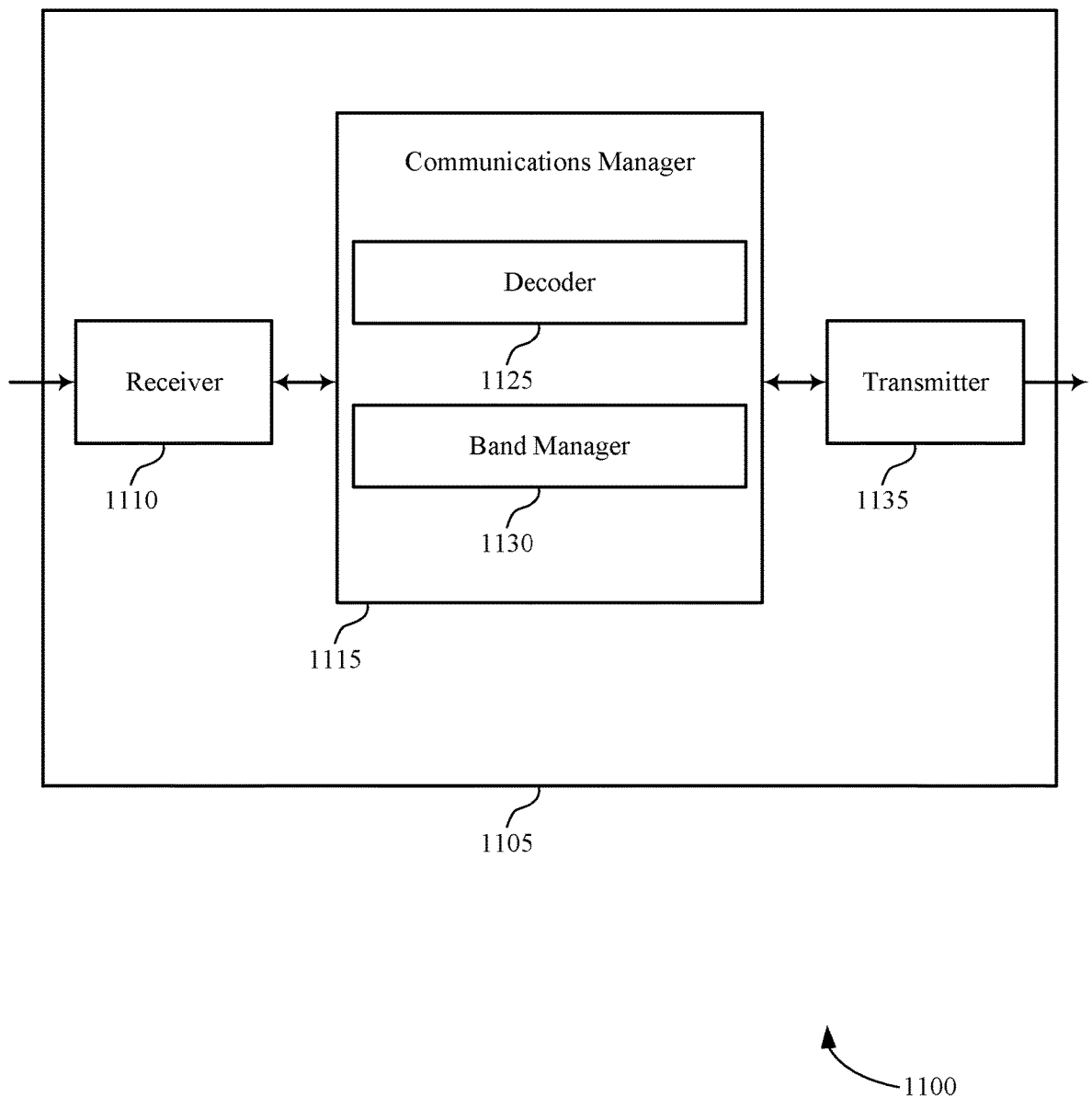

FIG. 11 shows a block diagram 1100 of a device 1105 that supports signaling multi-band operating parameters in a WLAN in accordance with aspects of the present disclosure. The device 1105 may be an example of aspects of a device 1005 or a STA 115 as described herein. The device 1105 may include a receiver 1110, a communications manager 1115, and a transmitter 1135. The device 1105 may also include a processor. Each of these components may be in communication with one another (e.g., via one or more buses).

Receiver 1110 may receive information such as packets, user data, or control information associated with various information channels (e.g., control channels, data channels, and information related to signaling multi-band operating parameters in a WLAN, etc.). Information may be passed on to other components of the device 1105. The receiver 1110 may be an example of aspects of the transceiver 1220 described with reference to FIG. 12. The receiver 1110 may utilize a single antenna or a set of antennas.

The receiver 1110 may receive, from a first wireless device, a management frame including multi-band wrapper information element or a neighbor report information element including one or more subelements, each subelement including an indication of a frequency band of one or more frequency bands and operating parameters associated with the frequency band. In some cases, the management frame is received over a first frequency band.

The communications manager 1115 may be an example of aspects of the communications manager 1015 as described herein. The communications manager 1115 may include a decoder 1125 and a band manager 1130. The communications manager 1115 may be an example of aspects of the communications manager 1210 described herein.

The decoder 1125 may identify information for performing communications over one or more indicated frequency bands of the one or more frequency bands based on the multi-band wrapper information element or the neighbor report information element. In some examples, the decoder 1125 may decode the one or more subelements. In some cases, the one or more subelements include a set of subelements, each subelement including a set of information elements. In some examples, the decoder 1125 may decode a length field of the MB Wrapper IE or Neighbor Report IE. In some examples, the decoder 1125 may determine the length of an information field of the MB Wrapper IE or Neighbor Report IE. In some examples, the decoder 1125 may delineate between the one or more subelements based on identifying consecutive information elements indicating respective frequency bands. In some examples, the decoder 1125 may delineate between the one or more subelements of the multi-band wrapper information element or the neighbor report information element based on an out-of-order condition between adjacent information elements in the multi-band wrapper information element or the neighbor report information element.

In some examples, the decoder 1125 may decode a conditional inheritance information element indicating one or more information elements of the first frequency band to not be inherited for communications over the one or more frequency bands. In some examples, the decoder 1125 may identify the one or more information elements indicated in the conditional inheritance information element. In some examples, the decoder 1125 may decode a conditional inheritance information element indicating one or more information elements of the first frequency band to be inherited for communications over the one or more frequency bands.

The band manager 1130 may communicate over the one or more indicated frequency bands based on identifying the information for performing communications. In some examples, the band manager 1130 may identify one or more indicated frequency bands corresponding to the one or more subelements and one or more operating parameters associated with the one or more indicated frequency bands. In some examples, the band manager 1130 may communicate over the indicated frequency band based on the operating parameters of the given subelement. In some examples, the band manager 1130 may associate with the first wireless device without performing a scanning or probing operation. In some examples, the band manager 1130 may negotiate, over the first frequency band, a security key for communicating with the second wireless device on a different frequency band of the one or more frequency bands. In some examples, the band manager 1130 may negotiate, over the first frequency band, an acknowledgement procedure for communications with the second wireless device over on a different frequency band of the one or more frequency bands. In some examples, the band manager 1130 may inherit an information element associated with the first frequency band for transmissions over the one or more frequency bands. In some examples, the band manager 1130 may inherit an information element for the first frequency band corresponding to the empty information field for transmissions over the one or more frequency bands. In some examples, the band manager 1130 may inherit the indicated one or more information elements listed in a conditional inheritance information element indicating one or more information elements of the first frequency band to be inherited for communications over the one or more frequency bands.

Transmitter 1135 may transmit signals generated by other components of the device. In some examples, the transmitter 1135 may be collocated with a receiver 1110 in a transceiver module. For example, the transmitter 1135 may be an example of aspects of the transceiver 1220 described with reference to FIG. 12. The transmitter 1135 may utilize a single antenna or a set of antennas.

In some examples, the communications manager 1115 may be implemented as a wireless modem chipset, and the transmitter 1135 and the receiver 1110 may be implemented as a set of analog components (e.g., amplifiers, filters, phase shifters, etc.) that are controlled by the communications manager 1115 to transmit and receive signals, respectively. The communications manager 1115 may couple with the receiver 1010 over a receive interface and with the transmitter 1135 over a transmit interface.

Figure 12:
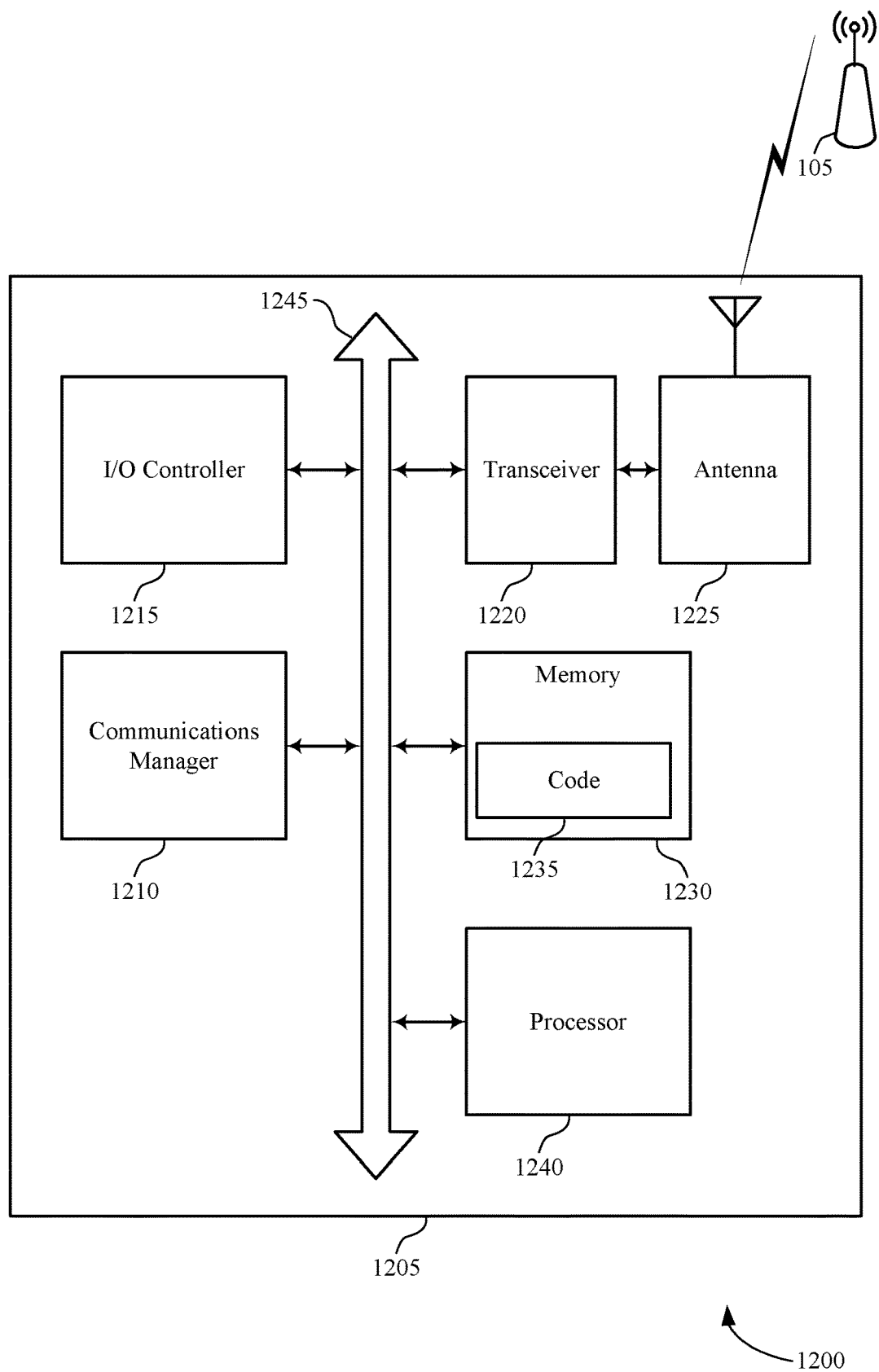
FIG. 12 shows a diagram of a system including a device that supports signaling multi-band operating parameters in a WLAN in accordance with aspects of the present disclosure.

FIG. 12 shows a diagram of a system 1200 including a device 1205 that supports signaling multi-band operating parameters in a WLAN in accordance with aspects of the present disclosure. The device 1205 may be an example of or include the components of device 1005, device 1105, or a STA as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may be an example of a communications manager 1015 or communications manager 1115 as discussed with reference to FIGS. 10 and 11.

I/O controller 1215 may manage input and output signals for device 1205. I/O controller 1215 may also manage peripherals not integrated into device 1205. In some cases, I/O controller 1215 may represent a physical connection or port to an external peripheral. In some cases, I/O controller 1215 may utilize an operating system such as iOS®, ANDROID®, MS-DOS®, MS-WINDOWS®, OS/2®, UNIX®, LINUX®, or another known operating system. In other cases, I/O controller 1215 may represent or interact with a modem, a keyboard, a mouse, a touchscreen, or a similar device. In some cases, I/O controller 1215 may be implemented as part of a processor. In some cases, a user may interact with device 1205 via I/O controller 1215 or via hardware components controlled by I/O controller 1215.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

Memory 1230 may include RAM and ROM. The memory 1230 may store computer-readable, computer-executable software 1235 including instructions that, when executed, cause the processor to perform various functions described herein. In some cases, the memory 1230 may contain, among other things, a BIOS which may control basic hardware or software operation such as the interaction with peripheral components or devices.

Processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1240 may be configured to operate a memory array using a memory controller. In other cases, a memory controller may be integrated into processor 1240. Processor 1240 may be configured to execute computer-readable instructions stored in a memory to perform various functions (e.g., functions or tasks supporting signaling multi-band operating parameters in a WLAN).

Figure 13:
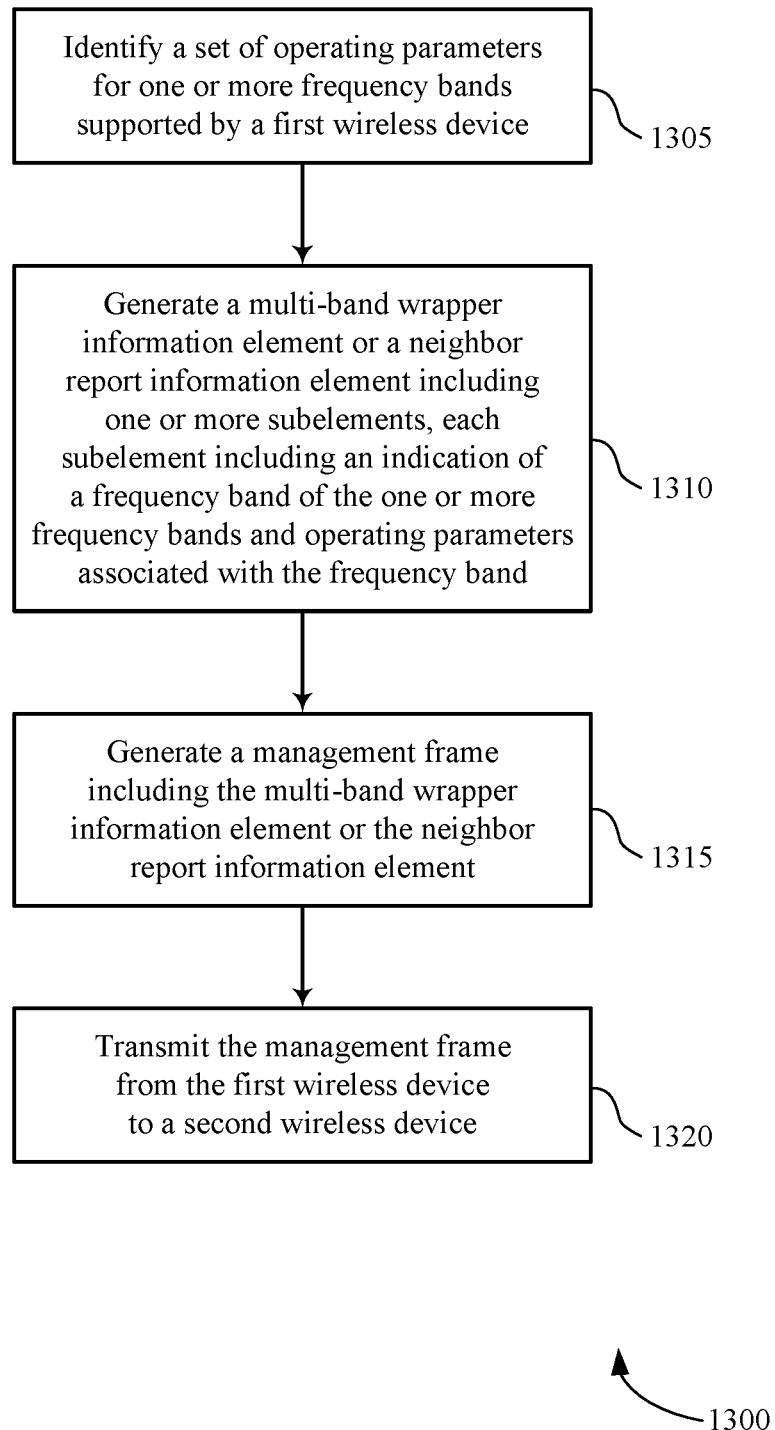
FIGS. 13 through 18 show flowcharts illustrating methods that support signaling multi-band operating parameters in a WLAN in accordance with aspects of the present disclosure.

FIG. 13 shows a flowchart illustrating a method 1300 that supports signaling multi-band operating parameters in a WLAN in accordance with aspects of the present disclosure. The operations of method 1300 may be implemented by a device or its components as described herein. For example, the operations of method 1300 may be performed by a communications manager as described with reference to FIGS. 7 through 9. In some examples, a device may execute a set of instructions to control the functional elements of the device to perform the functions described below. Additionally, or alternatively, a device may perform aspects of the functions described below using special-purpose hardware.

At 1305, the device may identify a set of operating parameters for one or more frequency bands supported by a first wireless device. The operations of 1305 may be performed according to the methods described herein. In some examples, aspects of the operations of 1305 may be performed by a band manager as described with reference to FIGS. 7 through 9.

At 1310, the device may generate a multi-band wrapper information element or a neighbor report information element including one or more subelements, each subelement including an indication of a frequency band of the one or more frequency bands and operating parameters associated with the frequency band. The operations of 1310 may be performed according to the methods described herein. In some examples, aspects of the operations of 1310 may be performed by an element generator as described with reference to FIGS. 7 through 9.

At 1315, the device may generate a management frame including the multi-band wrapper information element or the neighbor report information element. The operations of 1315 may be performed according to the methods described herein. In some examples, aspects of the operations of 1315 may be performed by a frame generator as described with reference to FIGS. 7 through 9.

At 1320, the device may transmit the management frame from the first wireless device to a second wireless device. The operations of 1320 may be performed according to the methods described herein. In some examples, aspects of the operations of 1320 may be performed by a transmitter as described with reference to FIGS. 7 through 9.

Figure 14:
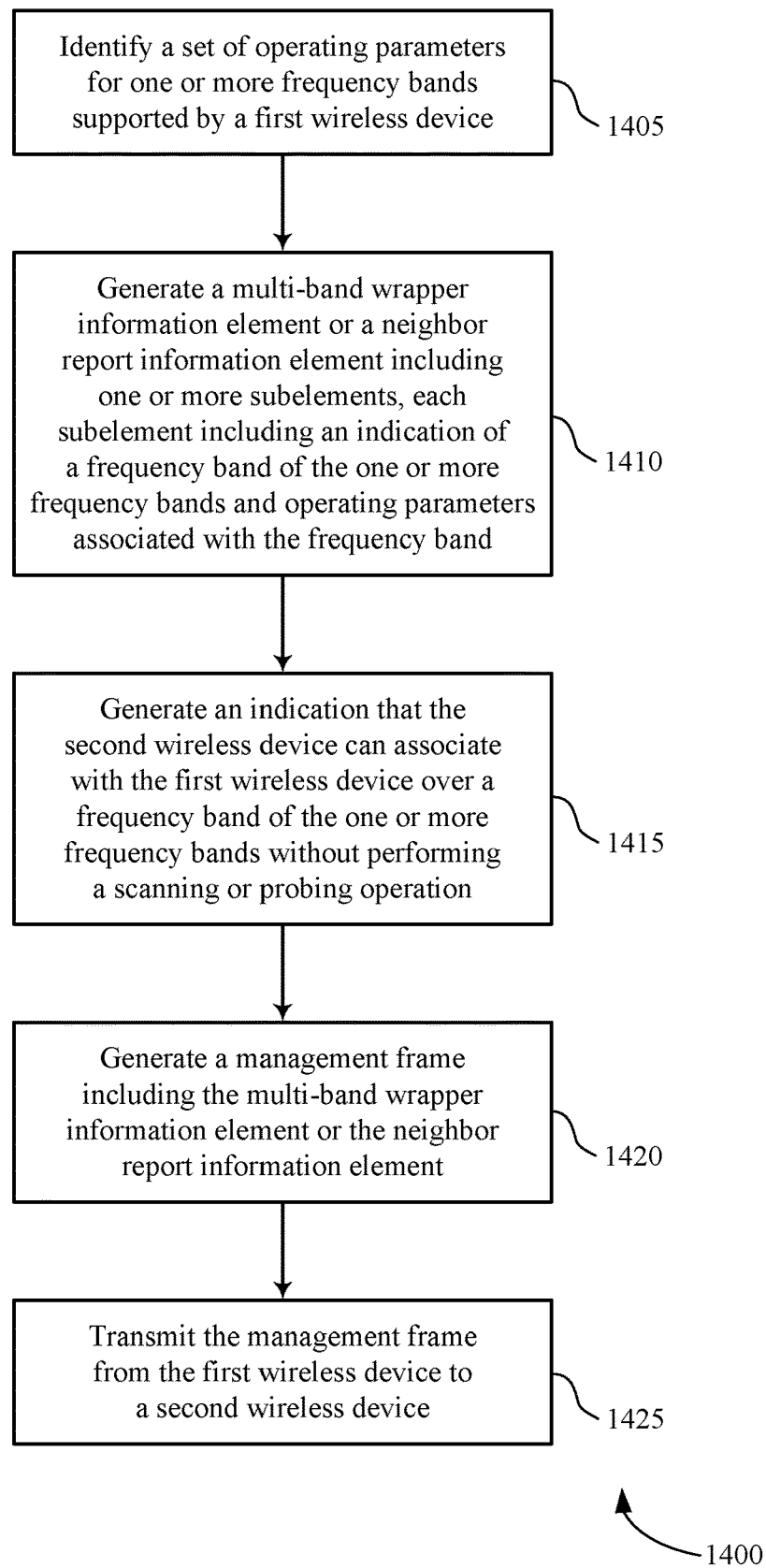

FIG. 14 shows a flowchart illustrating a method 1400 that supports signaling multi-band operating parameters in a WLAN in accordance with aspects of the present disclosure. The operations of method 1400 may be implemented by a device or its components as described herein. For example, the operations of method 1400 may be performed by a communications manager as described with reference to FIGS. 7 through 9. In some examples, a device may execute a set of instructions to control the functional elements of the device to perform the functions described below. Additionally, or alternatively, a device may perform aspects of the functions described below using special-purpose hardware.

At 1405, the device may identify a set of operating parameters for one or more frequency bands supported by a first wireless device. The operations of 1405 may be performed according to the methods described herein. In some examples, aspects of the operations of 1405 may be performed by a band manager as described with reference to FIGS. 7 through 9.

At 1410, the device may generate a multi-band wrapper information element or a neighbor report information element including one or more subelements, each subelement including an indication of a frequency band of the one or more frequency bands and operating parameters associated with the frequency band. The operations of 1410 may be performed according to the methods described herein. In some examples, aspects of the operations of 1410 may be performed by an element generator as described with reference to FIGS. 7 through 9.

At 1415, the device may generate an indication that the second wireless device can associate with the first wireless device over a frequency band of the one or more frequency bands without performing a scanning or probing operation. The operations of 1420 may be performed according to the methods described herein. In some examples, aspects of the operations of 1420 may be performed by an element generator as described with reference to FIGS. 7 through 9.

At 1420, the device may generate a management frame including the multi-band wrapper information element or the neighbor report information element. The operations of 1415 may be performed according to the methods described herein. In some examples, aspects of the operations of 1415 may be performed by a frame generator as described with reference to FIGS. 7 through 9.

At 1425, the device may transmit the management frame from the first wireless device to a second wireless device. The operations of 1425 may be performed according to the methods described herein. In some examples, aspects of the operations of 1425 may be performed by a transmitter as described with reference to FIGS. 7 through 9.

Figure 15:
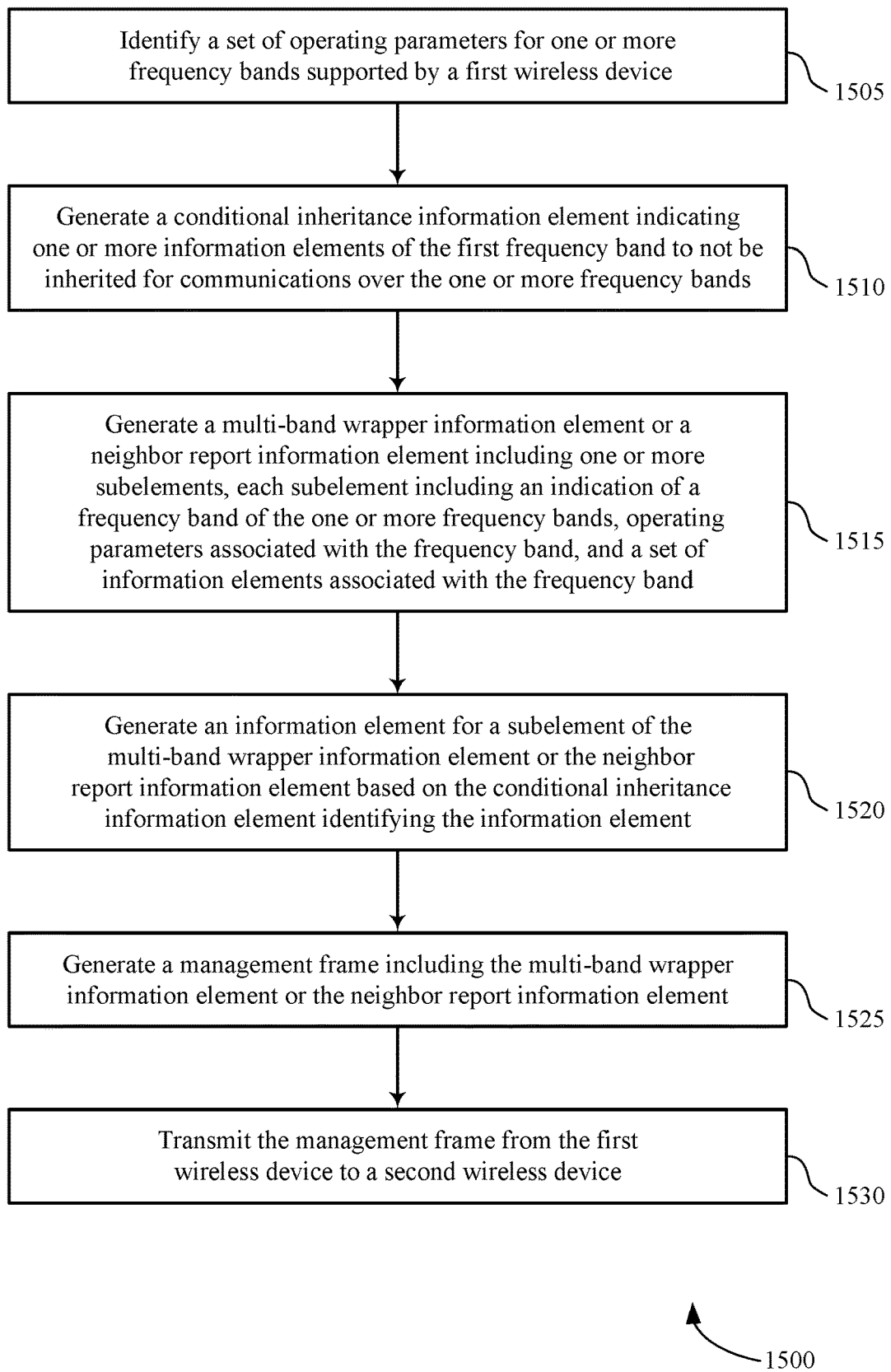

FIG. 15 shows a flowchart illustrating a method 1500 that supports signaling multi-band operating parameters in a WLAN in accordance with aspects of the present disclosure. The operations of method 1500 may be implemented by a device or its components as described herein. For example, the operations of method 1500 may be performed by a communications manager as described with reference to FIGS. 7 through 9. In some examples, a device may execute a set of instructions to control the functional elements of the device to perform the functions described below. Additionally, or alternatively, a device may perform aspects of the functions described below using special-purpose hardware.

At 1505, the device may identify a set of operating parameters for one or more frequency bands supported by a first wireless device. The operations of 1505 may be performed according to the methods described herein. In some examples, aspects of the operations of 1505 may be performed by a band manager as described with reference to FIGS. 7 through 9.

At 1510, the device may generate a conditional inheritance information element indicating one or more information elements of the first frequency band to not be inherited for communications over the one or more frequency bands. The operations of 1510 may be performed according to the methods described herein. In some examples, aspects of the operations of 1510 may be performed by an element generator as described with reference to FIGS. 7 through 9.

At 1515, the device may generate a multi-band wrapper information element or a neighbor report information element including one or more subelements, each subelement including an indication of a frequency band of the one or more frequency bands, operating parameters associated with the frequency band, and a set of information elements associated with the frequency band. The operations of 1515 may be performed according to the methods described herein. In some examples, aspects of the operations of 1515 may be performed by an element generator as described with reference to FIGS. 7 through 9.

At 1520, the device may generate an information element for a subelement of the multi-band wrapper information element or the neighbor report information element based on the conditional inheritance information element identifying the information element. The operations of 1525 may be performed according to the methods described herein. In some examples, aspects of the operations of 1525 may be performed by an element generator as described with reference to FIGS. 7 through 9.

At 1525, the device may generate a management frame including the multi-band wrapper information element or the neighbor report information element. The operations of 1530 may be performed according to the methods described herein. In some examples, aspects of the operations of 1530 may be performed by a frame generator as described with reference to FIGS. 7 through 9.

At 1530, the device may transmit the management frame from the first wireless device to a second wireless device. The operations of 1535 may be performed according to the methods described herein. In some examples, aspects of the operations of 1535 may be performed by a transmitter as described with reference to FIGS. 7 through 9.

Figure 16:
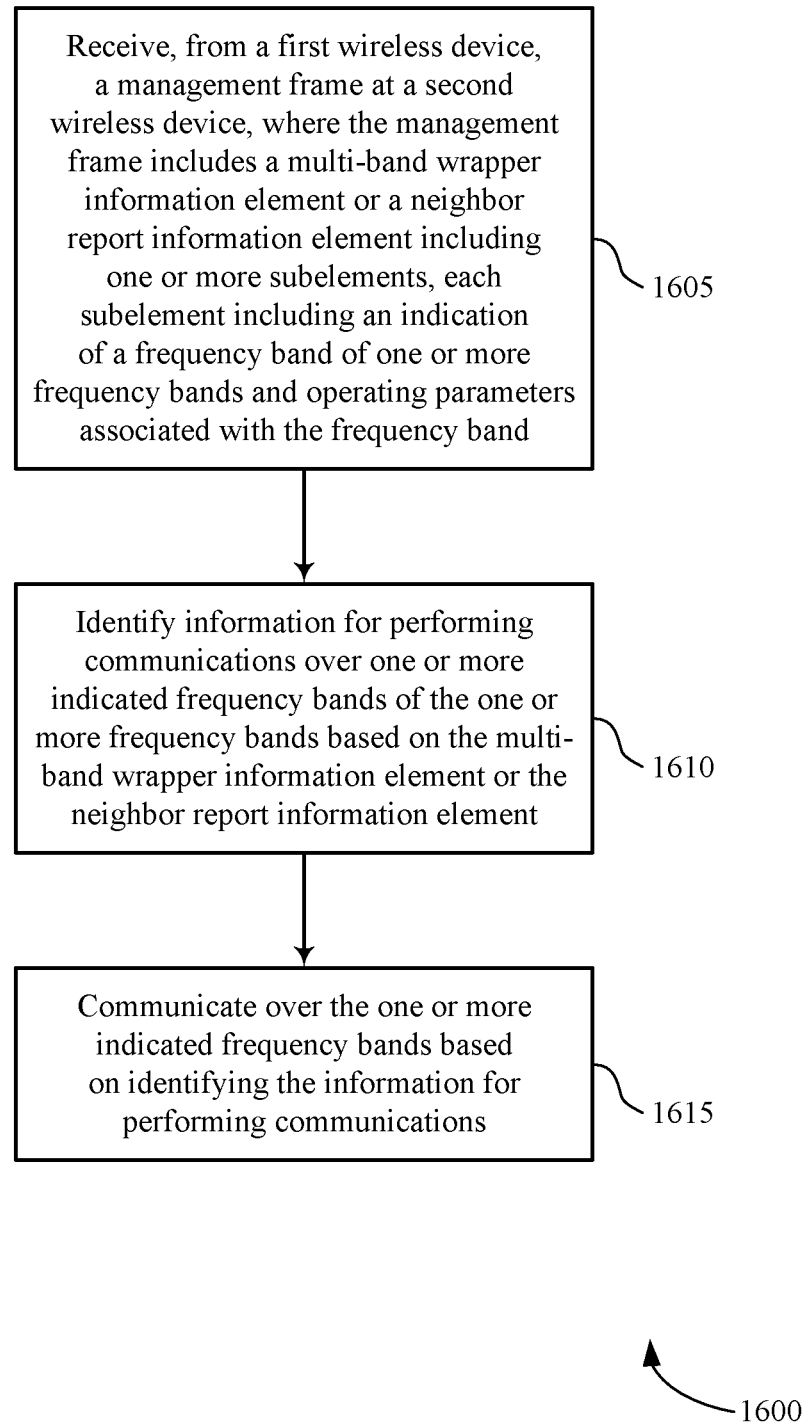

FIG. 16 shows a flowchart illustrating a method 1600 that supports signaling multi-band operating parameters in a WLAN in accordance with aspects of the present disclosure. The operations of method 1600 may be implemented by a STA or its components as described herein. For example, the operations of method 1600 may be performed by a communications manager as described with reference to FIGS. 10 through 12. In some examples, a STA may execute a set of instructions to control the functional elements of the STA to perform the functions described below. Additionally, or alternatively, a STA may perform aspects of the functions described below using special-purpose hardware.

At 1605, the STA may receive, from a first wireless device, a management frame at a second wireless device, where the management frame includes multi-band wrapper information element or a neighbor report information element including one or more subelements, each subelement including an indication of a frequency band of one or more frequency bands and operating parameters associated with the frequency band. The operations of 1605 may be performed according to the methods described herein. In some examples, aspects of the operations of 1605 may be performed by a receiver as described with reference to FIGS. 10 through 12.

At 1610, the STA may identify information for performing communications over one or more indicated frequency bands of the one or more frequency bands based on the multi-band wrapper information element or the neighbor report information element. The operations of 1610 may be performed according to the methods described herein. In some examples, aspects of the operations of 1610 may be performed by a decoder as described with reference to FIGS. 10 through 12.

At 1615, the STA may communicate over the one or more indicated frequency bands based on identifying the information for performing communications. The operations of 1615 may be performed according to the methods described herein. In some examples, aspects of the operations of 1615 may be performed by a band manager as described with reference to FIGS. 10 through 12.

Figure 17:
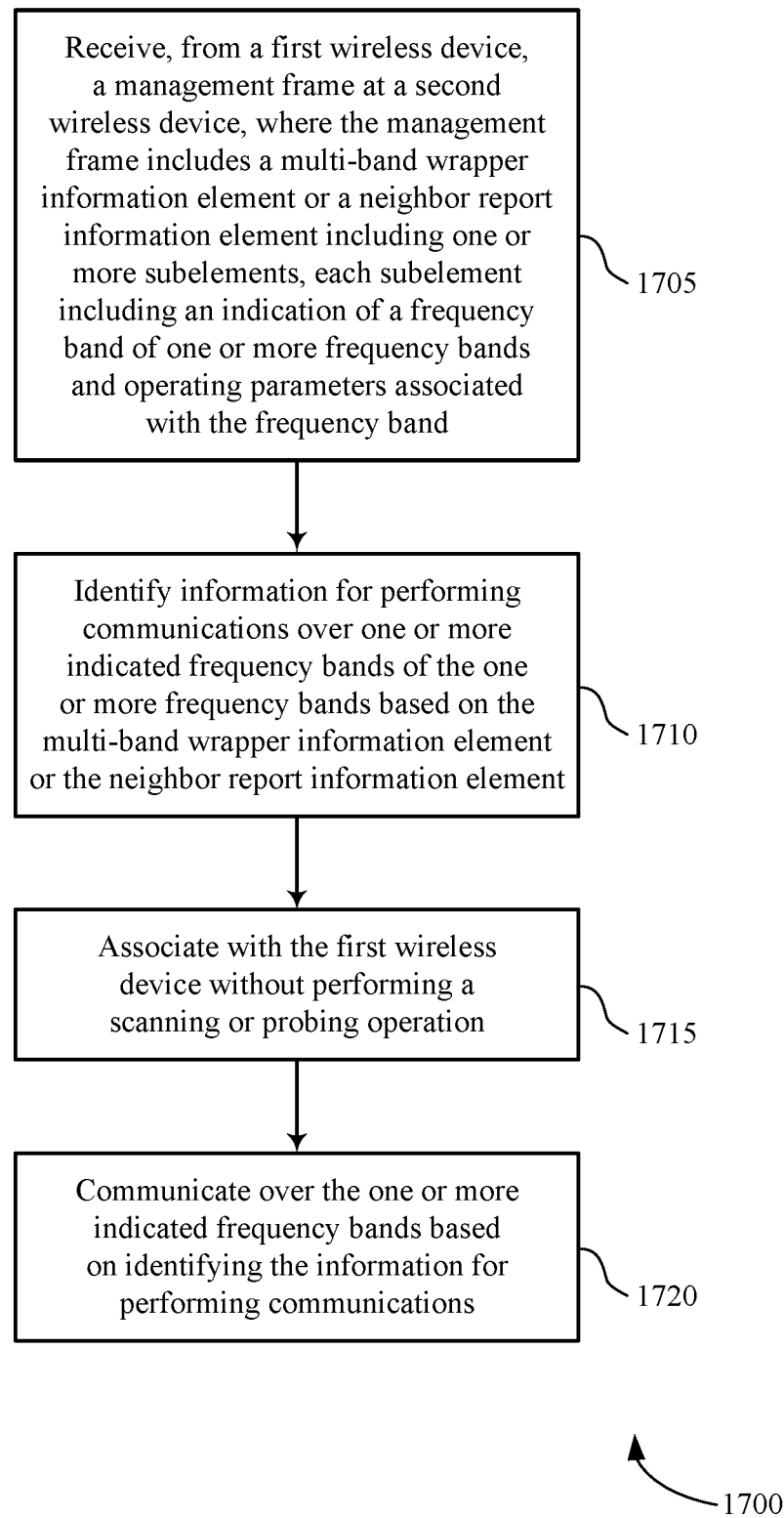

FIG. 17 shows a flowchart illustrating a method 1700 that supports signaling multi-band operating parameters in a WLAN in accordance with aspects of the present disclosure. The operations of method 1700 may be implemented by a STA or its components as described herein. For example, the operations of method 1700 may be performed by a communications manager as described with reference to FIGS. 10 through 12. In some examples, a STA may execute a set of instructions to control the functional elements of the STA to perform the functions described below. Additionally, or alternatively, a STA may perform aspects of the functions described below using special-purpose hardware.

At 1705, the STA may receive, from a first wireless device, a management frame at a second wireless device, where the management frame includes multi-band wrapper information element or a neighbor report information element including one or more subelements, each subelement including an indication of a frequency band of one or more frequency bands and operating parameters associated with the frequency band. The operations of 1705 may be performed according to the methods described herein. In some examples, aspects of the operations of 1705 may be performed by a receiver as described with reference to FIGS. 10 through 12.

At 1710, the STA may identify information for performing communications over one or more indicated frequency bands of the one or more frequency bands based on the multi-band wrapper information element or the neighbor report information element. The operations of 1710 may be performed according to the methods described herein. In some examples, aspects of the operations of 1710 may be performed by a decoder as described with reference to FIGS. 10 through 12.

At 1715, the STA may associate with the first wireless device without performing a scanning or probing operation. The operations of 1715 may be performed according to the methods described herein. In some examples, aspects of the operations of 1715 may be performed by a band manager as described with reference to FIGS. 10 through 12.

At 1720, the STA may communicate over the one or more indicated frequency bands based on identifying the information for performing communications. The operations of 1720 may be performed according to the methods described herein. In some examples, aspects of the operations of 1720 may be performed by a band manager as described with reference to FIGS. 10 through 12.

Figure 18:
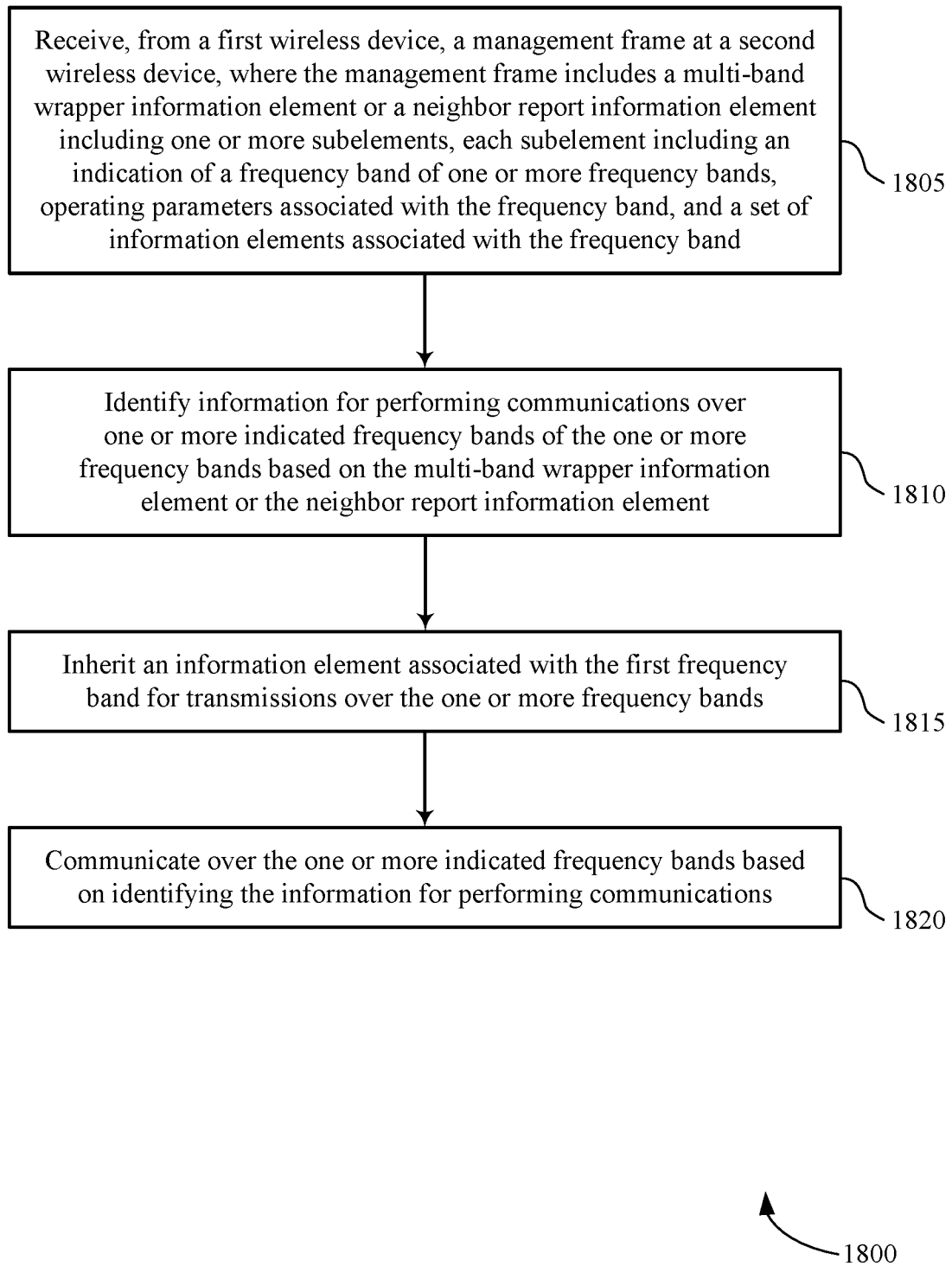

FIG. 18 shows a flowchart illustrating a method 1800 that supports signaling multi-band operating parameters in a WLAN in accordance with aspects of the present disclosure. The operations of method 1800 may be implemented by a STA or its components as described herein. For example, the operations of method 1800 may be performed by a communications manager as described with reference to FIGS. 10 through 12. In some examples, a STA may execute a set of instructions to control the functional elements of the STA to perform the functions described below. Additionally, or alternatively, a STA may perform aspects of the functions described below using special-purpose hardware.

At 1805, the STA may receive, from a first wireless device, a management frame at a second wireless device, where the management frame includes multi-band wrapper information element or a neighbor report information element including one or more subelements, each subelement including an indication of a frequency band of one or more frequency bands, operating parameters associated with the frequency band, and a set of information elements associated with the frequency band. The operations of 1805 may be performed according to the methods described herein. In some examples, aspects of the operations of 1805 may be performed by a receiver as described with reference to FIGS. 10 through 12.

At 1810, the STA may identify information for performing communications over one or more indicated frequency bands of the one or more frequency bands based on the multi-band wrapper information element or the neighbor report information element. The operations of 1815 may be performed according to the methods described herein. In some examples, aspects of the operations of 1815 may be performed by a decoder as described with reference to FIGS. 10 through 12.

At 1815, the STA may inherit an information element associated with the first frequency band for transmissions over the one or more frequency bands. The operations of 1820 may be performed according to the methods described herein. In some examples, aspects of the operations of 1820 may be performed by a band manager as described with reference to FIGS. 10 through 12.

At 1820, the STA may communicate over the one or more indicated frequency bands based on identifying the information for performing communications. The operations of 1825 may be performed according to the methods described herein. In some examples, aspects of the operations of 1825 may be performed by a band manager as described with reference to FIGS. 10 through 12.

It should be noted that the methods described above describe possible implementations, and that the operations and the blocks may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communications subsystem 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include random access memory (RAM), read only memory (ROM), electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless communication device, comprising:
receiving, via a first link of one or more links from a second wireless communication device, a management frame, wherein the management frame comprises a multi-link element or a neighbor report element, wherein the multi-link element or the neighbor report element includes a subelement field comprising one or more subelements, each subelement comprising a plurality of elements and an indication of a second link of the one or more links, an indication of a channel associated with the second link, or one or more operating parameters associated with the second link, and wherein the plurality of elements within each subelement are ordered sequentially based at least in part on an element identifier value of each of the plurality of elements;
identifying information for communicating via the second link based at least in part on the multi-link element or the neighbor report element; and
communicating via at least the second link based at least in part on the identified information.

2. The method of claim 1, wherein the neighbor report element indicates a neighboring basic service set that is implemented by or collocated with the second wireless communication device.

3. The method of claim 1, the multi-link element or the neighbor report element comprises an information field comprising one or more additional subelements and having a variable length, wherein identifying the information for communicating comprises:
decoding the one or more additional subelements; and
identifying one or more additional links corresponding to the one or more additional subelements and one or more operating parameters associated with the one or more additional links.

4. The method of claim 3, wherein the multi-link element or the neighbor report element comprises a length field comprising an indication of a length of the information field, wherein identifying the information for communicating comprises:
determining content of each subelement of the subelement field based at least in part on a subelement identification and the length field; and
determining content of the information field, wherein the information for communicating comprises the content of each subelement of the subelement field and the content of the information field.

5. The method of claim 3, wherein the information field comprises a control field indicating a link of a given subelement of the multi-link element or the neighbor report element, wherein communicating via at least the second link comprises:
communicating via at least the one or more additional links based at least in part on the one or more operating parameters of the given subelement.

6. The method of claim 1, wherein the multi-link element or the neighbor report element comprises an indication that the first wireless communication device can associate with the second wireless communication device via the second link of the one or more links independent of performing a scanning or probing operation, the method further comprising:
associating with the first wireless communication device independent of performing a scanning or probing operation.

7. The method of claim 6, wherein the management frame is received via the second link, the method further comprising:
negotiating, via the second link, a security key for communicating with the first wireless communication device via a different link of the one or more links; and
negotiating, via the second link, an acknowledgement procedure for communications with the first wireless communication device via the different link of the one or more links.

8. The method of claim 1, wherein the management frame comprises at least one operating parameter that indicates a transmit power for the one or more links.

9. The method of claim 1, wherein the management frame comprises at least one operating parameter that indicates channel access information.

10. The method of claim 9, wherein the at least one operating parameter that indicates channel access information includes at least one of a trigger based access information or enhanced distributed channel access information.

11. The method of claim 1, wherein the one or more subelements comprise a plurality of subelements, each subelement of the plurality of subelements comprising a second plurality of elements associated with the second link, wherein the indication of the second link comprises an element indicating the second link, and wherein the second plurality of elements within each subelement are further ordered so that the element indicating the second link is located at a beginning of the second plurality of elements, the method further comprising:
delineating between the one or more subelements based on identifying consecutive elements indicating respective links.

12. The method of claim 1, further comprising:
delineating between the one or more subelements of the multi-link element or the neighbor report element based at least in part on an out-of-order condition between adjacent elements in the multi-link element or the neighbor report element.

13. The method of claim 1, wherein the management frame further comprises a non-inheritance element indicating one or more elements associated with the first link not to be inherited for communications via a second link of the one or more links.

14. The method of claim 1, wherein the management frame comprises a non-inheritance element indicating one or more elements associated with the first link to be inherited for communications via the one or more links, the method further comprising:
inheriting the one or more elements.

15. The method of claim 3, wherein the variable length of the information field indicates a presence of at least some of the one or more operating parameters.

16. The method of claim 1, wherein the management frame further comprises a non-inheritance element comprising an identification list, the method further comprising:
mapping one or more element identification values listed in the element identification list to at least one of the plurality of elements associated with the first link; and
inheriting an element of the plurality of elements associated with the first link, wherein inheriting the element is based at least in part on the whether the inherited element is not associated with any of the one or more element identification values.

17. The method of claim 1, further comprising:
inheriting one or more elements of the plurality of elements within each subelement, wherein identifying the information for communicating via the second link is further based at least in part on the inherited one or more elements.

18. The method of claim 17, wherein at least one subelement comprises an empty information field, and wherein inheriting the one or more elements for the first link corresponds to the empty information field for transmissions via the one or more links.

19. A method for wireless communication at a first wireless communication device, comprising:
identifying a set of operating parameters for one or more links supported by a second wireless communication device;
generating a multi-link element or a neighbor report element, the multi-link element or the neighbor report element including a subelement field comprising one or more subelements, each subelement comprising a plurality of elements and an indication of a link, an indication of a channel associated with the link, or one or more operating parameters associated with the link, and wherein the plurality of elements within each subelement are ordered sequentially based at least in part on an element identifier value of each of the plurality of elements;
generating a management frame comprising the multi-link element or the neighbor report element; and
transmitting the management frame from the first wireless communication device to the second wireless communication device via at least the link.

20. The method of claim 19, wherein the neighbor report element indicates a neighboring basic service set that is implemented by or collocated with the second wireless communication device.

21. The method of claim 19, wherein a first basic service set is associated with a second link of the one or more links and a second basic service set is associated with a third link of the one or more links, the method further comprising:
restricting enhanced distributed channel access to the second basic service set based at least in part on a collocation of the first basic service set and the second basic service set.

22. The method of claim 19, wherein generating the multi-link element or the neighbor report element comprises at least one of:
generating a length field comprising an indication of a length of an information field, generating a control field within the information field, wherein the control field indicates a link of a given subelement of the multi-link element or the neighbor report element, and generating an indication that the second wireless communication device can associate with the first wireless communication device via the link of the one or more links independent of performing a scanning or probing operation.

23. An apparatus for wireless communication, comprising:
one or more processors;
one or more memories coupled with the one or more processors; and
instructions stored in the one or more memories and executable by the one or more processors to cause the apparatus to:
obtain, via a first link of one or more links, a management frame, wherein the management frame comprises a multi-link element or a neighbor report element, wherein the multi-link element or the neighbor report element includes a subelement field comprising one or more subelements, each subelement comprising a plurality of elements and an indication of a second link, an indication of a channel associated with the second link, or one or more operating parameters associated with the second link, and wherein the plurality of elements within each subelement are ordered sequentially based at least in part on an element identifier value of each of the plurality of elements;
identify information for communicating via at least the second link of the one or more links based at least in part on the multi-link element or the neighbor report element; and
output one or more messages for transmission or obtain the one or more messages communicated via at least the second link based at least in part on the identified information.

24. The apparatus of claim 23, wherein the neighbor report element indicates a neighboring basic service set that is implemented by or collocated with a wireless communication device.

25. The apparatus of claim 23, wherein the multi-link element or the neighbor report element comprises an information field comprising one or more additional subelements and having a variable length, and wherein the instructions stored in the one or more memories are further executable by the one or more processors to cause the apparatus to:
decode the one or more subelements; and
identify one or more additional links corresponding to the one or more subelements and one or more operating parameters associated with the one or more additional links.

26. The apparatus of claim 25, wherein the multi-link element or the neighbor report element comprises a length field comprising an indication of a length of the information field, and the instructions stored in the one or more memories are further executable by the one or more processors to cause the apparatus to:
determine contents of each subelement of the subelement field based at least in part on a subelement identification and the length field; and
determine contents of the information field.

27. The apparatus of claim 25, wherein the information field comprises a control field indicating a link of a given subelement of the multi-link element or the neighbor report element, and wherein the instructions stored in the one or more memories are further executable by the one or more processors to cause the apparatus to:
output for transmission or obtain one or more messages communicated via at least the one or more additional links based at least in part on the one or more operating parameters of the given subelement.

28. The apparatus of claim 23, wherein the multi-link element or the neighbor report element comprises an indication that a first wireless communication device can associate with a second wireless communication device via a second link independent of performing a scanning or probing operation, and wherein the instructions stored in the one or more memories are further executable by the one or more processors to cause the apparatus to:
associate with the second wireless communication device independent of performing a scanning or probing operation.

29. The apparatus of claim 28, wherein the management frame is obtained via the second link, and wherein the instructions stored in the one or more memories are further executable by the one or more processors to cause the apparatus to:

negotiate, via the second link, a security key for communicating with the first wireless communication device on a different link of the one or more links.

30. The apparatus of claim 28, wherein the management frame is outputted via the second link, and wherein the instructions stored in the one or more memories are further executable by the one or more processors to cause the apparatus to:

negotiate, via the second link, an acknowledgement procedure for communications with the first wireless communication device via a different link of the one or more links.

31. The apparatus of claim 23, further comprising:
a transceiver, wherein the instructions stored in the one or more memories and executable by the one or more processors to cause the apparatus to receive, via the transceiver, the management frame, wherein the apparatus is configured as a wireless communication device.

32. The apparatus of claim 23, the instructions stored in the one or more memories are further executable by the one or more processors to cause the apparatus to:

inherit one or more elements of the plurality of elements within each subelement, wherein the instructions to identify information for communicating via the second link is further based at least in part on the inherited one or more elements.

33. An apparatus for wireless communication, comprising:

one or more processors;
one or more memories coupled with the one or more processors; and
instructions stored in the one or more memories and executable by the one or more processors to cause the apparatus to:
identify a set of operating parameters for one or more links supported by the apparatus;
generate a multi-link element or a neighbor report element, the multi-link element or the neighbor report element includes a subelement field comprising one or more subelements, each subelement comprising a plurality of elements and an indication of a link, an indication of a channel associated with the link, or one or more operating parameters associated with the link, and wherein the plurality of elements within each subelement are ordered sequentially based at least in part on an element identifier value of each of the plurality of elements;
generate a management frame comprising the multi-link element or the neighbor report element; and
output the management frame for transmission to a wireless communication device via at least the link.

34. The apparatus of claim 33, further comprising:
a transceiver, wherein the instructions stored in the one or more memories and executable by the one or more processors to cause the apparatus to receive, via the transceiver, the management frame, wherein the apparatus is configured as a wireless communication device.

* * * * *